(12) United States Patent
Bloore et al.

(10) Patent No.: US 12,271,526 B1
(45) Date of Patent: Apr. 8, 2025

(54) HAPTIC COMMUNICATION DEVICES FOR TRACING TACTILE PATTERNS ON SKIN USING COMPACT ACTUATOR ARRAYS

(71) Applicants: Paul Langley Bloore, Torono (CA); Chrisula Bloore, Mountain View, CA (US); Stephen Ru, Toronto (CA)

(72) Inventors: Paul Langley Bloore, Torono (CA); Chrisula Bloore, Mountain View, CA (US); Stephen Ru, Toronto (CA)

(73) Assignee: 0102.IO INC., Toronto (CA)

( * ) Notice: Subject to any disclaimer, the term of this patent is extended or adjusted under 35 U.S.C. 154(b) by 0 days.

(21) Appl. No.: 18/405,853

(22) Filed: Jan. 5, 2024

(51) Int. Cl.
*G06F 3/01* (2006.01)

(52) U.S. Cl.
CPC .............. *G06F 3/016* (2013.01); *G06F 3/011* (2013.01)

(58) Field of Classification Search
CPC ................................ G06F 3/011; G06F 3/016
See application file for complete search history.

(56) References Cited

U.S. PATENT DOCUMENTS

| | | | |
|---|---|---|---|
| 3,659,354 | A | 5/1972 | Sutherland |
| 4,871,992 | A | 10/1989 | Petersen |
| 4,926,879 | A | 5/1990 | Sevrain et al. |
| 5,553,148 | A | 9/1996 | Werle |
| 5,942,970 | A | 8/1999 | Norman |
| 6,712,613 | B2 | 3/2004 | Depta |
| 7,226,291 | B2 | 6/2007 | Spedden |
| 7,979,146 | B2 | 7/2011 | Ullrich et al. |
| 8,362,882 | B2 | 1/2013 | Heubel et al. |
| 8,995,692 | B2 | 3/2015 | Efrati |
| 9,019,087 | B2 | 4/2015 | Bakircioglu et al. |
| 9,318,940 | B2 | 4/2016 | Efrati |
| 9,368,005 | B2 | 6/2016 | Cruz-Hernandez et al. |
| 9,390,676 | B2 | 7/2016 | Nieves |
| 9,424,759 | B2 | 8/2016 | Murphy et al. |
| 9,461,529 | B2 | 10/2016 | Efrati |
| 9,488,833 | B2 | 11/2016 | Cervantes |

(Continued)

FOREIGN PATENT DOCUMENTS

| | | | | |
|---|---|---|---|---|
| GB | 2607085 A | * | 11/2022 | ............... A43B 3/34 |
| WO | WO-2015100482 A1 | * | 7/2015 | ............. A41D 13/12 |

*Primary Examiner* — Quan Zhen Wang
*Assistant Examiner* — Mancil Littlejohn, Jr.
(74) *Attorney, Agent, or Firm* — Manelli Selter PLLC; Edward Stemberger

(57) ABSTRACT

This invention introduces a haptic communication system designed for high-bandwidth tactile interaction by converting external signals into dynamic patterns traced on the user's skin. It comprises a flexible, fabric-like mesh with a densely packed array of compact actuators. Activated sequentially, these actuators tap the skin, creating lines or patterns for tactile communication or sensory replacement. The mesh is adaptable for integration into wearable technology or electronic device casings, suitable for applications ranging from assistive devices for sensory impairments to immersive gaming and virtual reality experiences. The actuators are arranged in an array, with a controller managing power delivery to individual actuators, triggering movement for precise haptic feedback. This system offers a method for delivering nuanced, adjustable tactile sensations, paving the way for new forms of non-visual, non-auditory communication and interaction in diverse environments.

27 Claims, 31 Drawing Sheets

Miniature Actuators in Contact with Finger

(56) References Cited

U.S. PATENT DOCUMENTS

| | | |
|---|---|---|
| 9,646,514 B2 | 5/2017 | Rizzo |
| 9,786,201 B2 | 10/2017 | Ebeling et al. |
| 9,924,251 B2 | 3/2018 | Efrati |
| 9,996,153 B1 | 6/2018 | Trotta |
| 10,019,912 B2 | 7/2018 | Eagleman et al. |
| 10,079,009 B2 | 9/2018 | Efrati |
| 10,121,335 B2 | 11/2018 | Deokar et al. |
| 10,198,076 B2 | 2/2019 | Eagleman et al. |
| 10,249,217 B2* | 4/2019 | Moon .................. G09B 21/004 |
| 10,255,771 B2 | 4/2019 | Baron et al. |
| 10,438,609 B2 | 10/2019 | Foshee |
| 10,446,058 B2 | 10/2019 | Collins, Jr. |
| 10,613,627 B2 | 4/2020 | Levesque et al. |
| 10,642,362 B2 | 5/2020 | Eagleman et al. |
| 10,943,503 B2* | 3/2021 | Turcott .................. G06F 3/016 |
| 11,009,948 B2 | 5/2021 | Efrati |
| 11,589,816 B2* | 2/2023 | Leaper ................. A61B 5/6824 |
| 2003/0025595 A1 | 2/2003 | Langberg |
| 2007/0041600 A1 | 2/2007 | Zachman |
| 2013/0073954 A1 | 3/2013 | Nieves |
| 2013/0218456 A1 | 8/2013 | Zelek et al. |
| 2015/0125831 A1 | 5/2015 | Chandrashekhar Nair et al. |
| 2015/0227778 A1 | 8/2015 | Cervantes |
| 2015/0332659 A1 | 11/2015 | Ebeling et al. |
| 2015/0356889 A1 | 12/2015 | Schwartz |
| 2016/0337734 A1 | 11/2016 | Efrati |
| 2018/0033263 A1* | 2/2018 | Novich .................. G06F 3/016 |
| 2018/0052516 A1 | 2/2018 | Efrati |
| 2018/0301140 A1* | 10/2018 | Turcott .................. G06N 3/044 |
| 2019/0121439 A1 | 4/2019 | Eagleman |
| 2019/0164394 A1 | 5/2019 | Visitacion et al. |
| 2020/0023272 A1 | 1/2020 | Heubel |
| 2020/0076866 A1 | 3/2020 | Wu et al. |
| 2020/0209975 A1 | 7/2020 | Eagleman |
| 2021/0192904 A1 | 6/2021 | Moussette et al. |
| 2023/0019336 A1 | 1/2023 | Moussette et al. |
| 2023/0225056 A1 | 7/2023 | Sunshine et al. |

* cited by examiner

Virtual Combat

Text to Tap for Deafblind Users

Text to Tap for Deafblind Users Breakdown

Door Location Assistance for
Blind Users

Door Location Assistance for Blind Users Breakdown

Facial Location Assistance for Blind Users

Facial Location Assistance for Blind Users Breakdown

Tele-Touch Communication

Audio Visual Haptic Feedback

Generic Virtual Object Haptic Feedback

Virtual Grass Haptic Feedback

Haptic Vest

Haptic Wrist-Strap

Haptic Mobile Phone Case

Haptic Wristwatch - Back

Haptic Game Controller

Haptic Virtual Reality Controllers

Full-Body Haptic Suit

Haptic Array - Front

**Haptic Array - Back
with Controller**

Haptic Array - Detailed

Sequential Actuation

Variable Pattern Thickness

Miniature Actuator

**Unpowered Actuator
(Diametrically-Magnetized)**

**Powered Actuator
(Diametrically-Magnetized)**

**Unpowered Actuator
(Axially-Magnetized)**

**Powered Actuator
(Axially-Magnetized)**

Actuation Cycle

Miniature Actuators in Contact with Finger

HAPTIC COMMUNICATION DEVICES FOR TRACING TACTILE PATTERNS ON SKIN USING COMPACT ACTUATOR ARRAYS

FIELD

This specification relates to haptic communication systems and methods that incorporate an array of tactile actuators. The systems are used to communicate with users whose skin is in contact with the actuators. The systems may be used in fields such as support devices for individuals with visual or hearing impairments, virtual/augmented reality environment systems, input and output devices such as game controllers, teledildonic devices, and user notifications.

BACKGROUND

Haptic systems that incorporate tactile actuators are well known in the field of haptic communication. The prevailing assumption driving the design of tactile actuators and wearable tactile devices is that the skin lacks the sensitivity to differentiate between closely spaced points, often citing the Two-Point Discrimination (2PD) test, used to measure spatial acuity, as justification for lower-density arrays. As a result, existing wearable haptic devices predominantly utilize relatively few actuators for a given area of the body. In addition, these actuators tend to be large vibrotactile-style actuators, such as eccentric rotating mass actuators or linear resonant actuators, that stimulate large areas of the user's skin, and the distinction between individual actuators is usually possible only if they are widely spaced apart. These characteristics of existing wearable haptic devices limit the resolution and the types of tactile feedback they can provide.

However, the 2PD test has been proved to be an imprecise measure of spatial acuity and the current accepted threshold for static touch feature detection is significantly smaller, by an order of magnitude, compared to what 2PD testing suggested. Furthermore, the threshold for dynamic touch feature detection is smaller still, by another order of magnitude. Consequently, not only is it advantageous to increase the actuator density, as the skin is sensitive to high resolution haptic messages, but also to employ actuators that are non-vibratory and have a precise and minimal contact area with the skin. This minimizes overwhelming the sense of touch, and allows for the sequential activation of actuators to trace dynamic patterns, to which the skin is more acutely sensitive.

In comparison to the current market of low actuator density haptic devices outlined above, the versions detailed here offer a significant increase in actuator density, approximately an order of magnitude higher. This actuator array system and method are designed to trace out patterns, lines and arcs by activating adjacent actuators sequentially, thus conveying information as dynamic patterns. Tracing patterns on the skin is notably more effective for recognition compared to imprinting entire patterns simultaneously. For example, imprinting a circle on the skin all at once, by activating all the actuators in the circle simultaneously, overwhelms a user's sense of touch and makes it hard to distinguish the pattern as a circle. If instead, that circle is traced out, by activating the actuators in the circle in sequence one after the other, it makes it far easier to recognize as a circle.

The versions described offer a simple to operate and power-efficient array of haptic actuators designed to dynamically trace patterns on the skin by contacting the skin with discrete taps. This haptic system offers the ability to customize the speed, intensity and thickness of the traced patterns, allowing for the delivery of haptic messages that have a wide range of nuance, and ensure that each tap, integral to the pattern tracing, is perceived with reliability and precision.

The need exists for a haptic communication system and method that overcomes various issues associated with prior devices and methods, including those mentioned above. This system and method are valuable in environments where the senses of sight and/or hearing are impaired, overloaded, or require augmentation. The system and method provide an alternative means for the user to receive communication through the sense of touch.

SUMMARY

This invention presents a novel haptic communication system and method designed to interact with a user through the sense of touch. The core of the invention is a haptic device that communicates with a user via direct skin contact. It contains an array of hundreds or thousands of small, thin actuators, each individually capable of generating a non-vibratory, localized and precise tap on the skin.

The innovative aspect of the system lies in its ability to translate various inputs such as text, video and sound into dynamic patterns that are traced onto the user's skin. This is effective because dynamic haptic feedback is more perceptible to the skin than static haptic feedback. The system translates these inputs into haptic messages using processing software within a processing device. The translated haptic messages are then transmitted to a controller in the haptic device, which precisely manages the delivery of electrical power to individual actuators within the array. According to the haptic message, the controller varies the timing and intensity of each actuator activation to trace patterns with varied physical and temporal characteristics.

The actuator technology itself can be modified to incorporate different types of mechanisms capable of generating a non-vibratory tap on the skin. Examples of these mechanisms could be a moving magnet voice coil actuator that causes a permanent magnet to move from a resting position to a protruding position to generate haptic feedback, or a shape memory alloy actuator that triggers a mechanism shifting it from a resting position to a protruding position to generate haptic feedback.

A distinctive feature of the system is the flexible substrate of the actuator array. This allows the device to conform to different parts of the user's body in order to maximize skin contact with the actuator array, while allowing the user to retain a normal range of motion. The flexible substrate also allows the device to be incorporated into various materials and fabrics. This allows for the creation of smart clothing or accessories that can provide haptic feedback in a more discrete and integrated manner. For example, a haptic communication glove or sleeve could be developed for more targeted and localized interaction, beneficial in fields such as medical rehabilitation or remote tactile communication.

The method associated with this system involves processing various input signals into haptic messages characterized by unique parameters. These messages are then transmitted to the controller which sequentially activates the actuators in the haptic device to produce discernible patterns on the user's skin, effectively translating the input signals into a tactile experience.

This system and method represent a significant advancement over existing haptic technologies. The combination of a high-density actuator array with the dynamic tracing of patterns, achieved through the precise control of actuators, introduces a novel approach to haptic feedback. This invention is not only innovative but also non-obvious to those skilled in the art, marking a significant step forward in the field of haptic communication.

DETAILED DESCRIPTION

The explanations provided in the figures and example scenarios are illustrative and do not restrict the invention's scope. They are presented to help someone knowledgeable in the field understand, create, and utilize the invention. While various instances of the invention are described for clarity, they are not meant to be restrictive. There are numerous adaptations and changes that knowledgeable individuals can make without deviating from the core idea of the invention. The choice of words in this text aims to clarify the invention's principles and its practical applications.

Figure 1A:
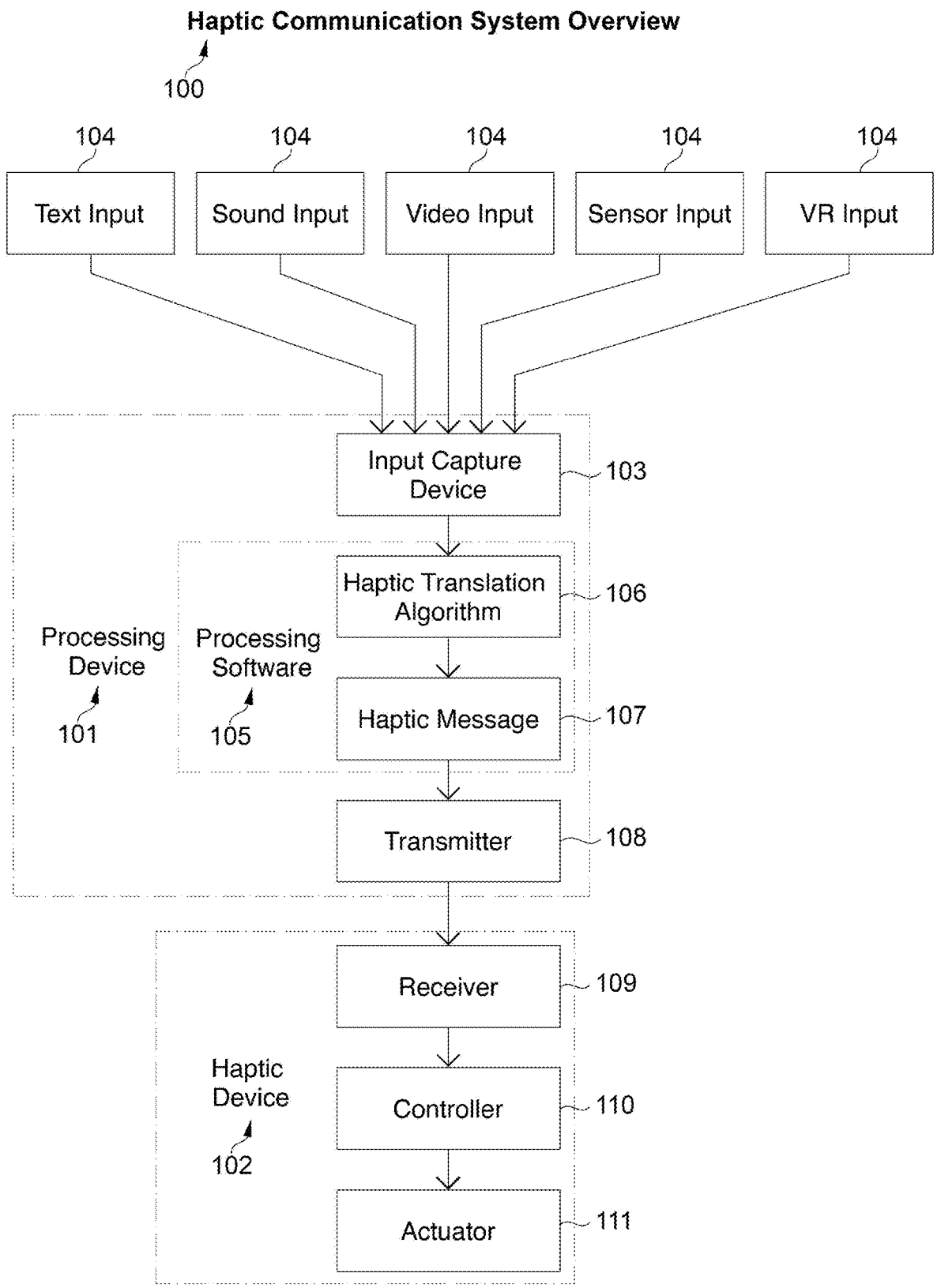
FIG. 1A shows a schematic view of a haptic communication system as described in a version of this invention.

FIG. 1A is a schematic view of a haptic communication system 100 having a processing device 101 and a haptic device 102. Processing device 101 has an input capture device 103 that is adapted to receive inputs 104 (which include text, sound, video, sensor and/or VR inputs). Inputs 104 are then sent to processing software 105 where a haptic translation algorithm 106 generates a haptic message 107 that is then sent by transmitter 108 to haptic device 102. Haptic message 107 is received by receiver 109 of haptic device 102 and processed through controller 110 to cause actuators 111 to dynamically trace haptic message 107 on a user's skin.

Figure 1B:
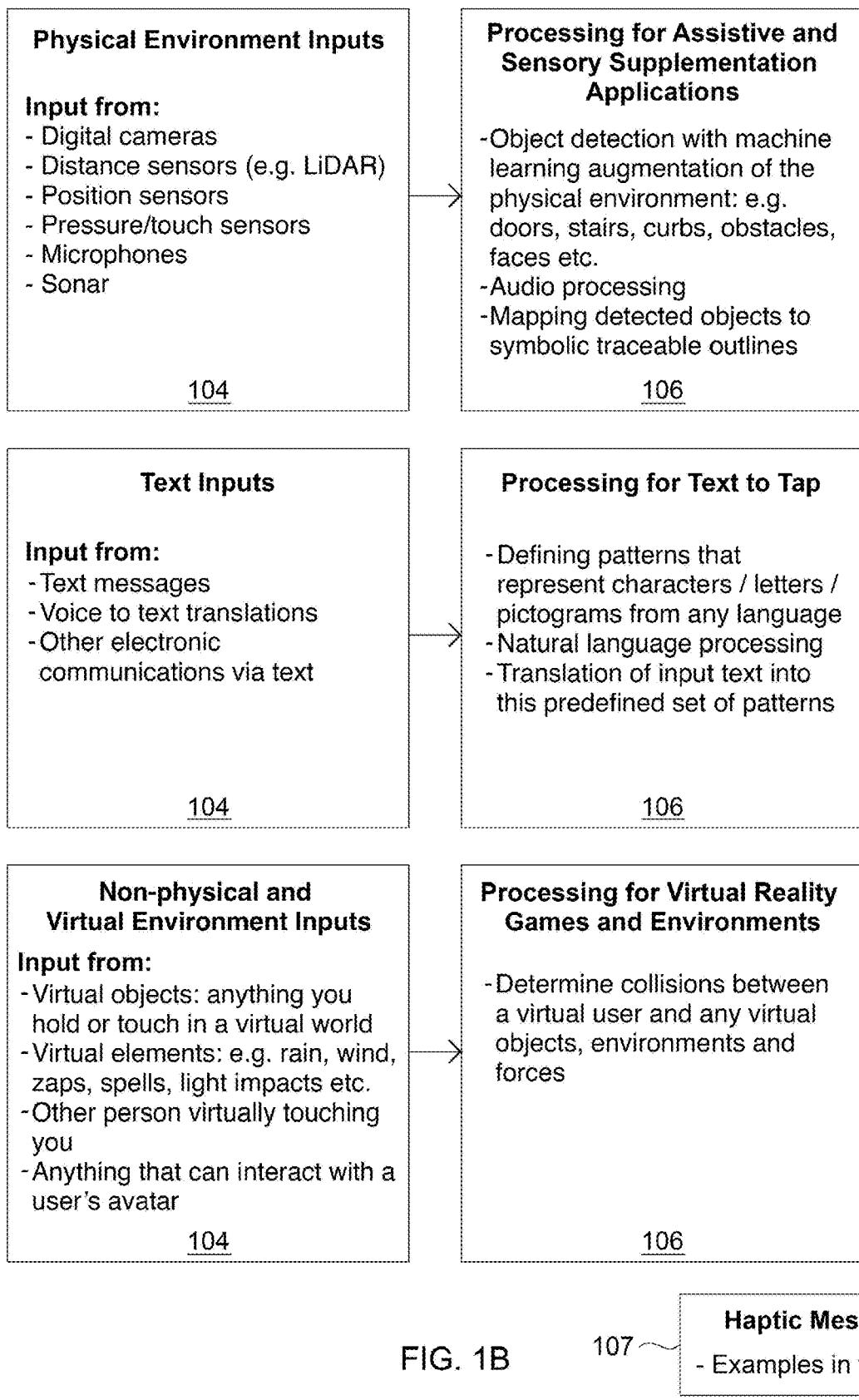
FIG. 1B shows a schematic view of a haptic communication system as described in a version of this invention.

FIG. 1B is a schematic view with examples of how inputs 104 are processed by processing device 101 of system 100 to produce and transmit a haptic message 107 to haptic device 102. One example concerns physical environment inputs 104 (such as inputs from digital cameras, distance sensors such as LIDAR, position sensors, pressure/touch sensors, microphones or sonar sensors) that are processed by processing device 101 for use with assistive and sensory supplementation applications. Such processing may include object detection with machine learning augmentation of the physical environment, audio processing or mapping of detected objects to symbolic traceable taps or outlines from actuators 111. Another example concerns text inputs (such as inputs from text messages, voice to text translations or other electronic communications via text) that are processed by processing device 101 for use with converting text to taps or outlines from actuators 111. Such processing may include defining patterns that represent characters, letters, pictograms or other elements from any language, natural language processing or translation of input text into a predefined set of patterns. Another example concerns non-physical and virtual environment inputs (such as virtual objects that one may hold or touch in a virtual world, virtual elements relating for example to rain, wind, zaps, spells, light impacts etc., virtual touch from another person or any other environmental inputs that may interact with a user's avatar) that are processed by processing device 101 for use with converting such inputs into taps or outlines from actuators 111. Such processing may include determining collisions between a virtual user and any virtual objects, environments and forces.

FIG. 2A-L are schematic views of non-exhaustive use cases of how system 100 can provide information to a user by dynamically tracing patterns over the user's skin. Any traced pattern can generally be modulated or repeated to convey urgency and other information. The speed of the trace, the width of traced lines, and the strength of the taps generating the trace are all controlled individually through processing software 105 and adjusted to the usage and the individual using the system.

Figure 2A:
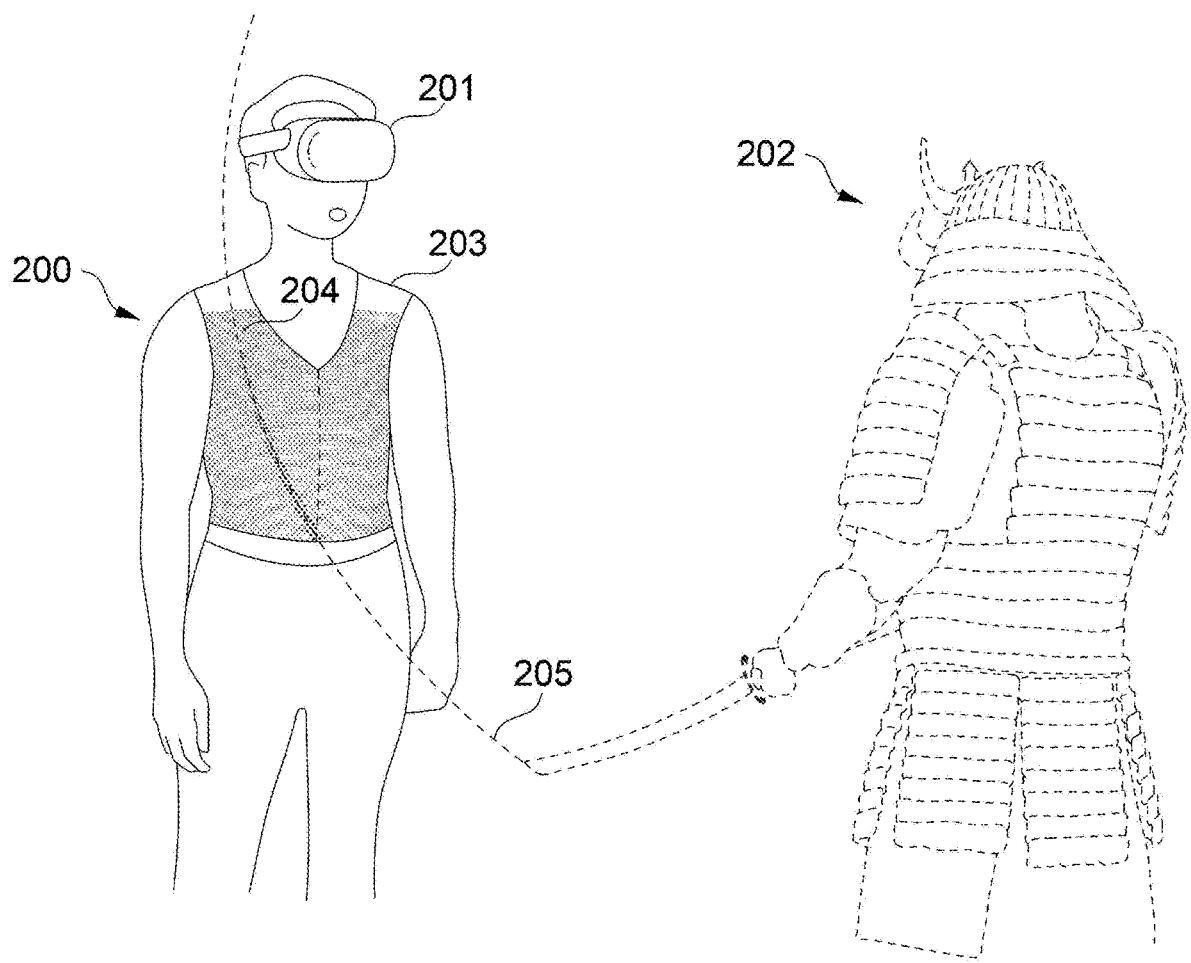
FIG. 2A shows a schematic view of a user with a haptic communication system in the form of a vest as described in a version of this invention.

In FIG. 2A, a person 200 playing a virtual reality game via a headset 201 is attacked by a virtual player 202. The player 200 is able to feel the attack via haptic device 102 embodied as a vest 203 through a sequence of taps 204 from actuators 111 that mimic the stroke of the attacking sword 205.

Figure 2B:
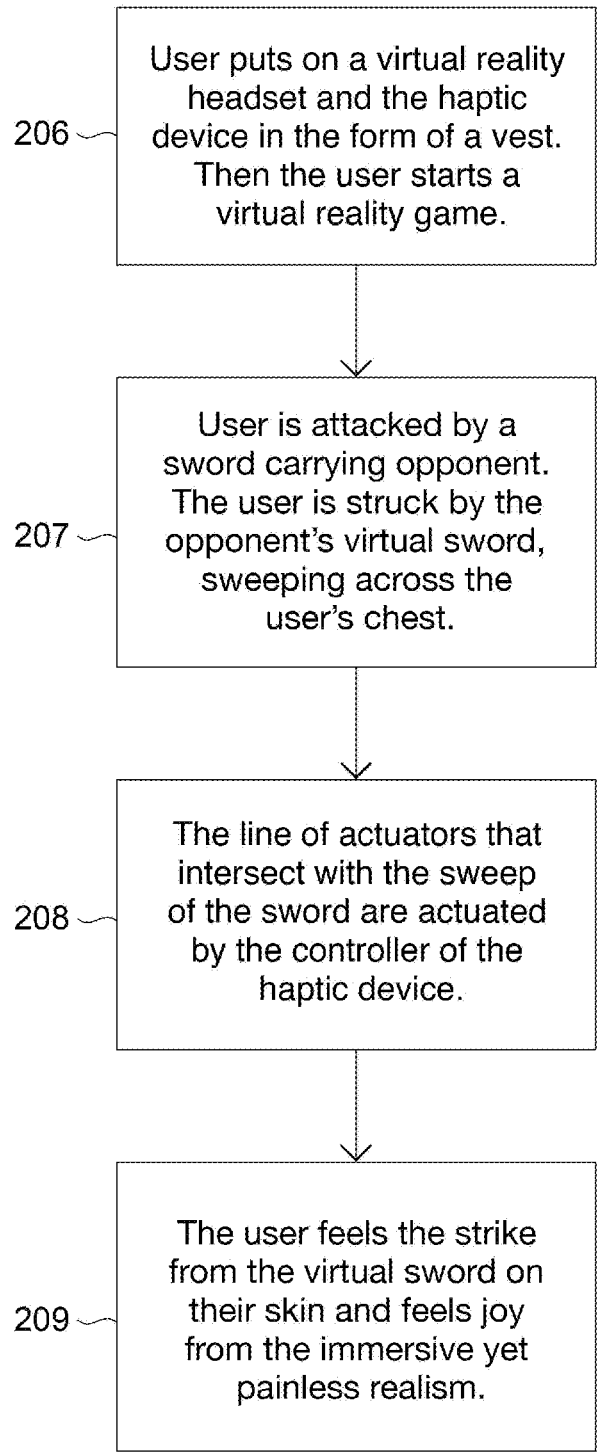
FIG. 2B shows a flowchart detailing the haptic communication system for the user depicted in FIG. 2A.

FIG. 2B describes the process steps for FIG. 2B via a detailed flow chart. The process steps include step 206 where system 100 is connected to a virtual reality game with the user 200 wearing haptic device 102 in the form of a vest 203. Processing device 101 may be incorporated into vest 203 or carried separately by the user. At step 207, system 100 receives input 104 from the virtual reality game indicating that the user has been struck by a virtual sword 205. At step 208, system 100 processes input 104 through processing device 101 to generate haptic message 107 that is transmitted to haptic device 102. At process step 209, controller 110 causes actuators 111 to trace a line on the user's skin to simulate the feel of the sword strike.

Figure 2C:
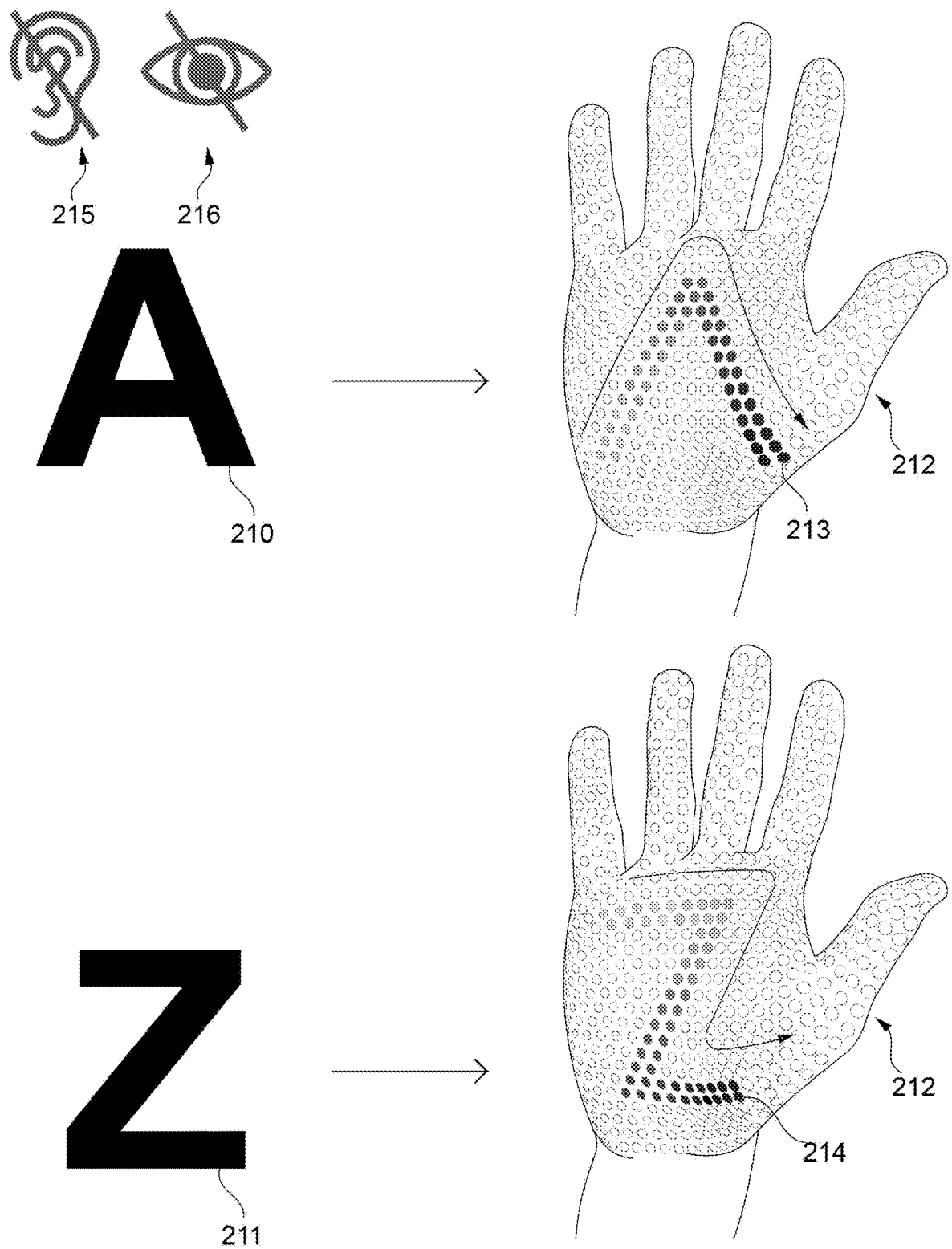
FIG. 2C shows a schematic view of a user with a haptic communication system in the form of a glove as described in a version of this invention.

In FIG. 2C, language as represented by the letters "A" 210 and "Z" 211 is communicated to the user via the haptic device 102 embodied as a glove 212. Words can be communicated by tapping out individual letters 213 & 214 in order, onto the palm of the user's hand along the path as indicated by the arrows. Although not limited to, the system in this embodiment could allow deaf 215 and/or blind 216 users to communicate without the need for an intervener.

Figure 2D:
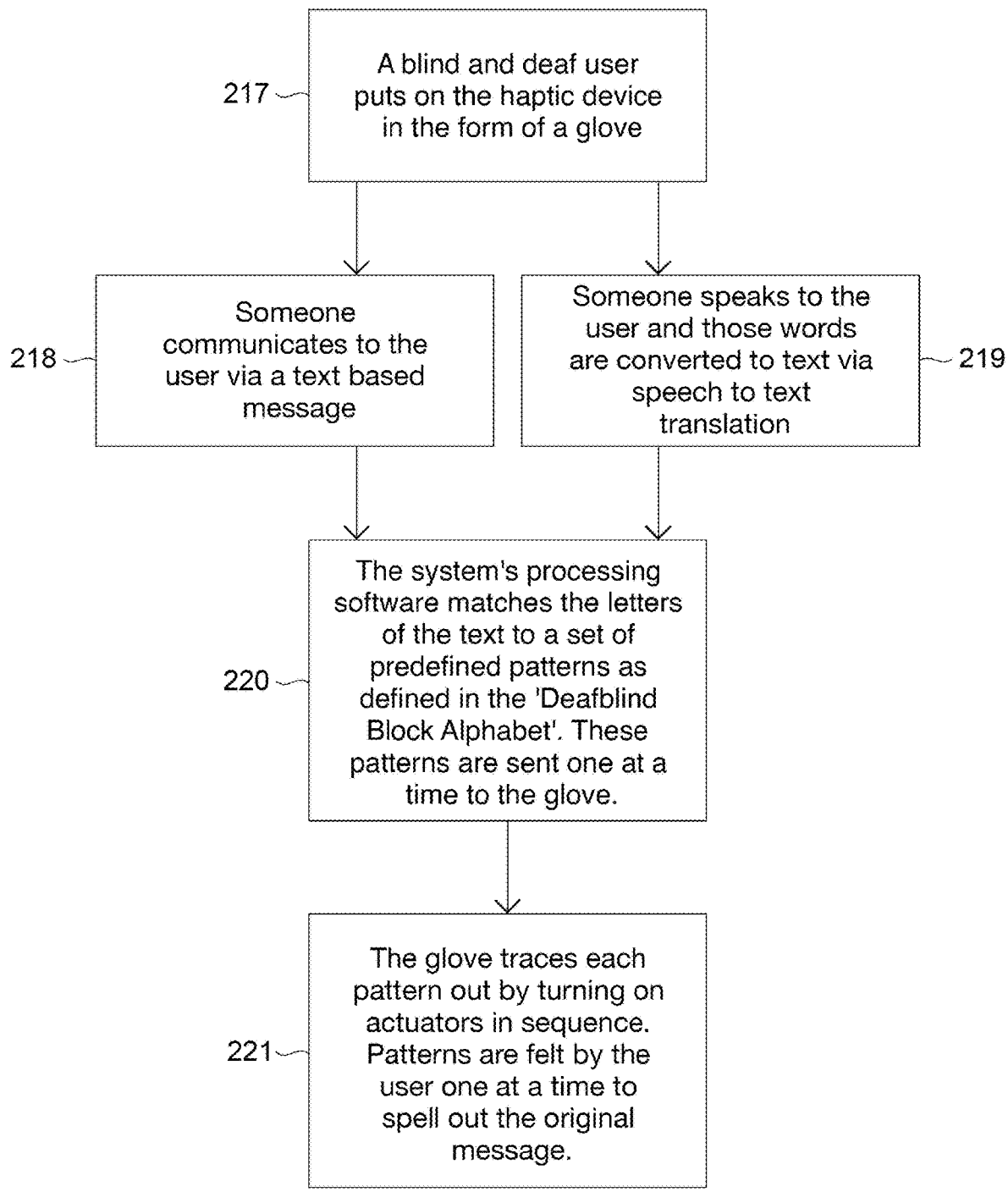
FIG. 2D shows a flowchart detailing the haptic communication system for the user depicted in FIG. 2C.

FIG. 2D describes the process steps for FIG. 2C via a detailed flow chart. The process steps include step 217 where a user wears glove 212 that includes haptic device 102 of system 100. Processing device 101 may be incorporated into glove 212 or carried separately by the user. At step 218 the user receives input 104 in the form of a text message. Alternatively, at step 219 the user receives input 104 in the form spoken words that are converted to a text message. The process continues to step 220 where system 100 processes input 104 from either step 218 or 219 through processing device 101 to generate haptic message 107 that is transmitted to haptic device 102 in glove 212. The haptic message may be generated according to widely accepted standards such as the "Deafblind Block Alphabet" or other methods. At process step 221, controller 110 causes actuators 111 to trace a line or pattern on the user's skin to communicate the original text or voice input.

Figure 2E:
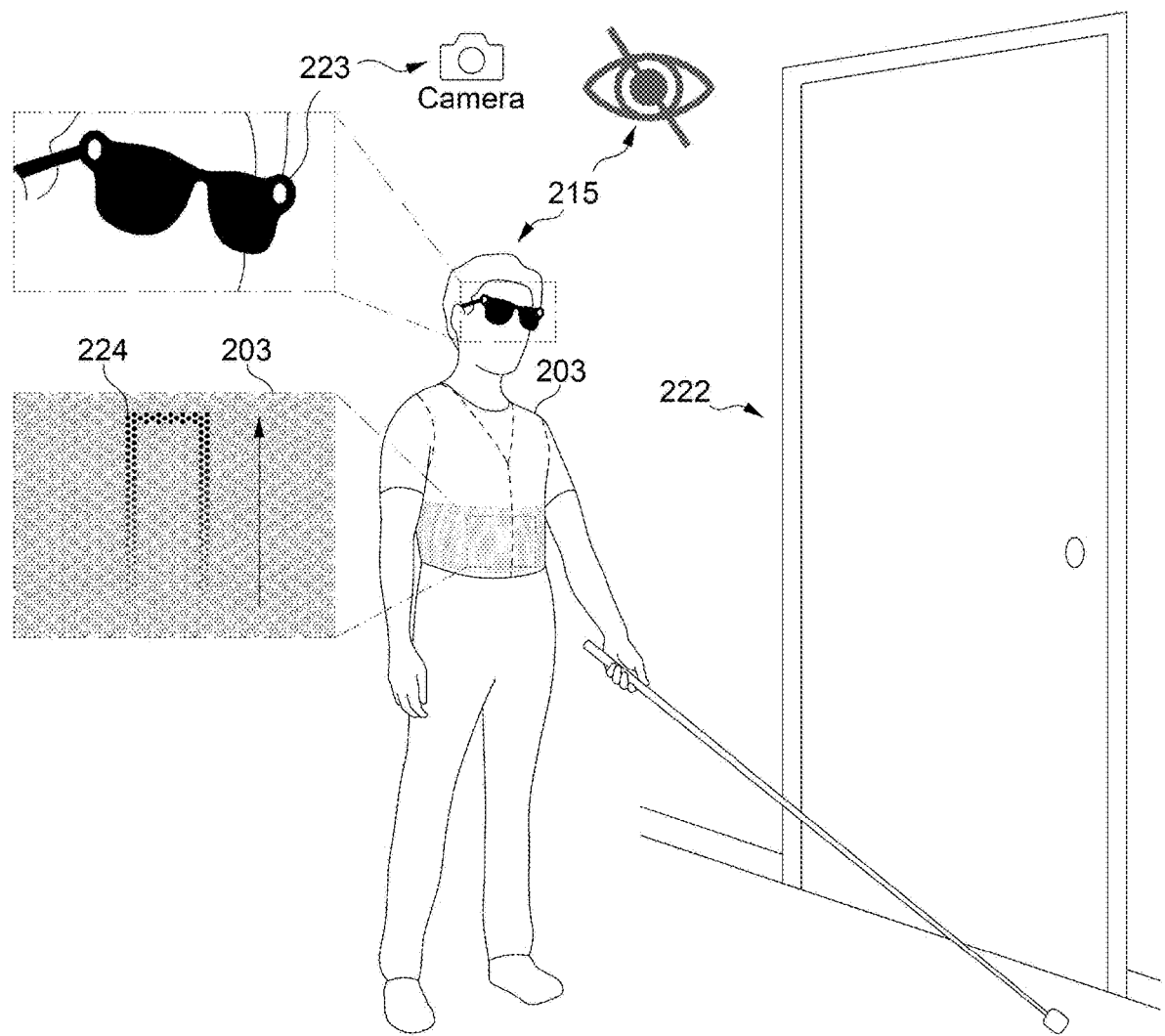
FIG. 2E shows a schematic view of a user with a haptic communication system in the form of a vest as described in a version of this invention.

In FIG. 2E, a blind person 215 wearing the haptic device 102 embodied as a vest 203 detects that a door 222 is closed. The closed door 222 is detected through a camera 223 that is embedded inside a pair of glasses. This camera feed input 104 is processed by the processing device 101 and relayed to the haptic device 102 as two vertical lines which are tapped out in an upwards direction 224. Variations in the tapped pattern can be used to indicate further information, such as the size of the door, the distance the user is from the door, and whether the door is open or closed.

Figure 2F:
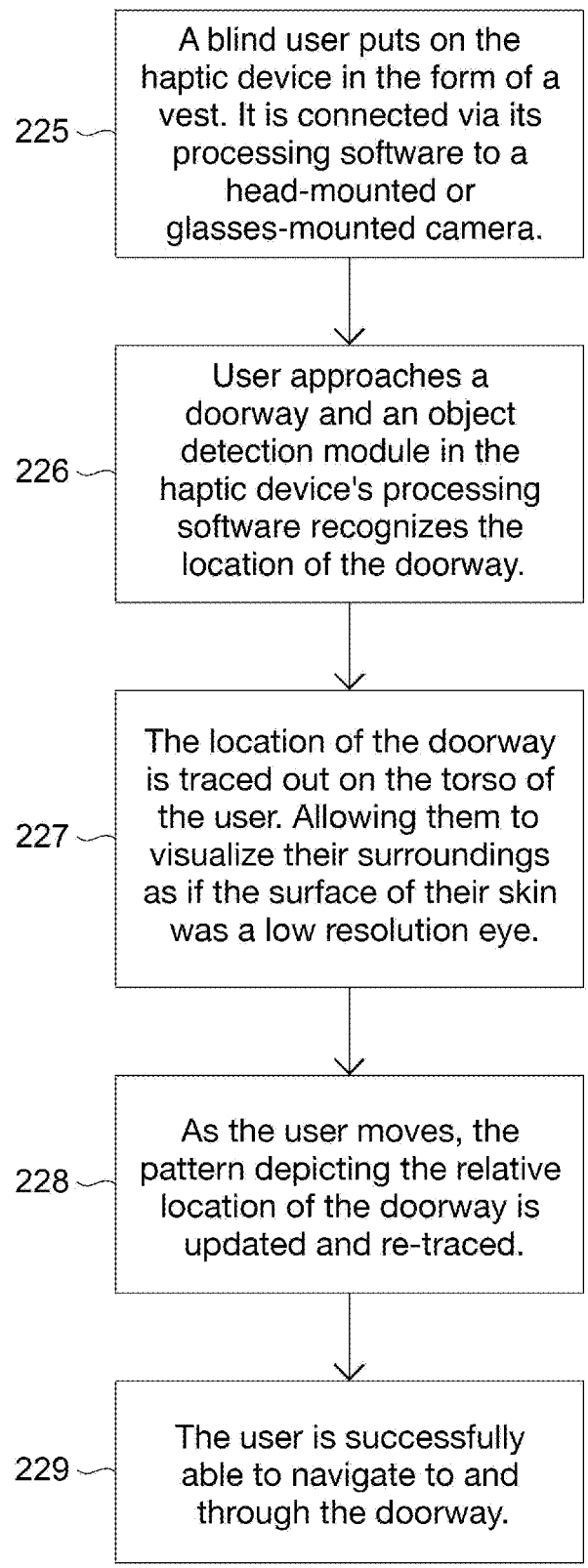
FIG. 2F shows a flowchart detailing the haptic communication system for the user depicted in FIG. 2E.

FIG. 2F describes the process steps for FIG. 2E via a detailed flow chart. The process steps include step 225 where a user wears a vest 203 that includes haptic device 102 of system 100. Processing device 101 may be incorporated into vest 203 or carried separately by the user. Processing device 101 is adapted to receive inputs 104 from camera 223 worn by the user. At step 226, object detection software associated with the processing software 105 of the processing device 101 determines that the user is approaching door 222. At step 227, system 100 processes input 104 through processing device 101 to generate haptic message 107 that is transmitted to haptic device 102 in vest 203 representing the door 222. At step 228, system 100 receives and processes further inputs 104 as the user moves relative to door 222 and updates the haptic messages representing door 222 transmitted to vest 203. At step 229, the user is able to successfully navigate through door 222 with the assistance of system 100.

Figure 2G:
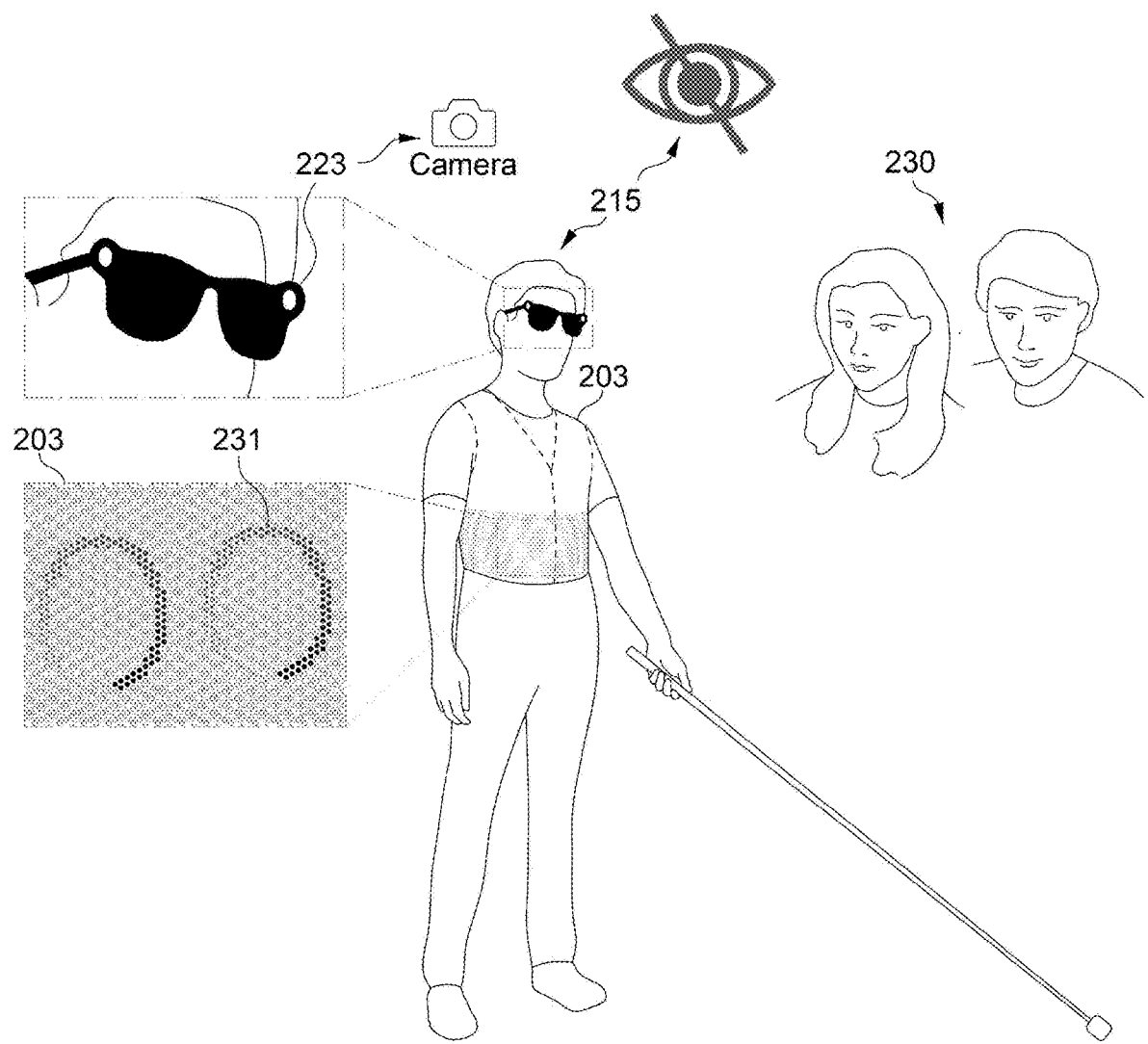
FIG. 2G shows a schematic view of a user with a haptic communication system in the form of a vest as described in a version of this invention.

In FIG. 2G, a blind person 215 wearing the haptic device embodied as a vest 203 detects the location of two other persons' faces 230. The faces are detected through a camera 223 that is embedded inside a pair of glasses. This camera feed input 104 is processed by the processing device 101 and relays it to the haptic device 102 as two ellipses 231 which are tapped out radially to represent each face. In addition to the location of faces, other kinds of information can be delivered, such as facial or expression recognition.

Figure 2H:
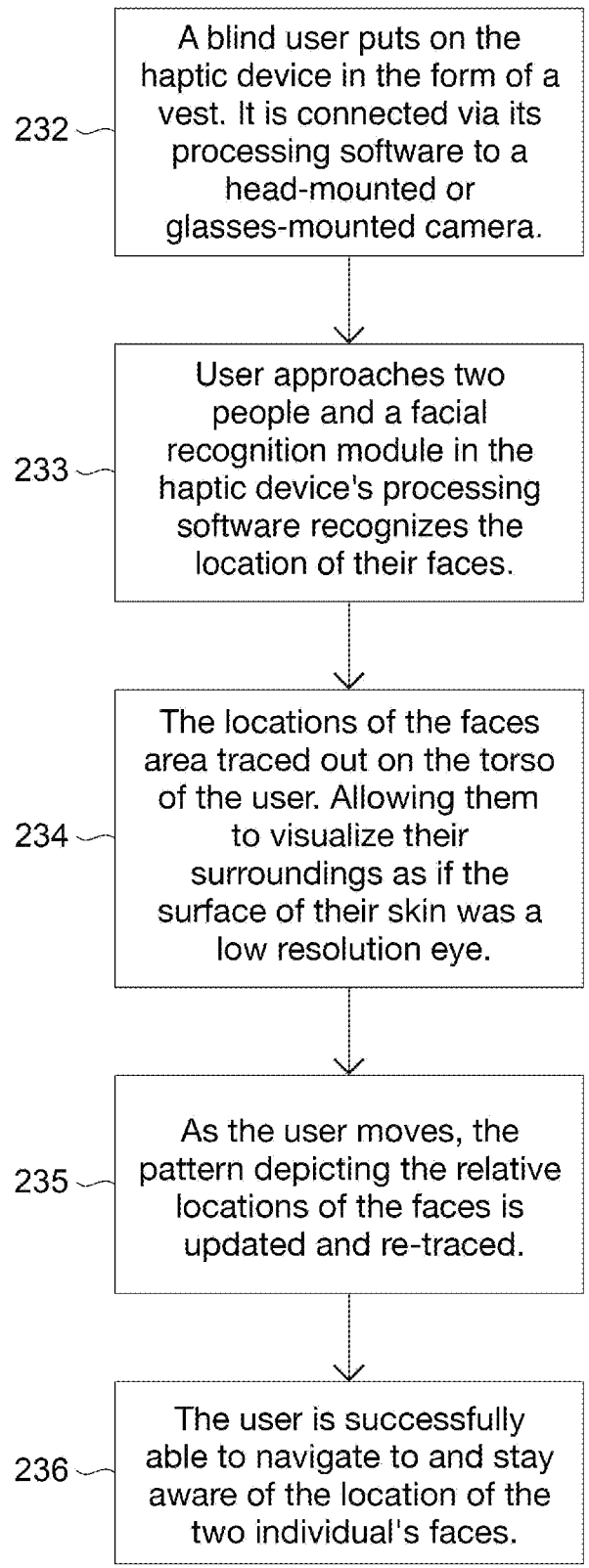
FIG. 2H shows a flowchart detailing the haptic communication system for the user depicted in FIG. 2G.

FIG. 2H describes the process steps of FIG. 2G via a detailed flow chart. The process steps include step 232 where a user wears a vest 203 that includes haptic device 102 of system 100. Processing device 101 may be incorporated into vest 203 or carried separately by the user. Processing device 101 is adapted to receive inputs 104 from camera 223 worn by the user. At step 233, facial recognition software associated with the processing software 105 of the processing device 101 determines the location of one or more faces 230. At step 234, system 100 processes input 104 through processing device 101 to generate haptic message 107 that is transmitted to haptic device 102 in vest 203 representing the one or more faces 230. At step 235, system 100 receives and processes further inputs 104 as the user moves relative to faces 230 and updates the haptic messages representing faces 230 transmitted to vest 203. At step 236, the user is able to successfully stay aware of the location of faces 230 with the assistance of system 100.

Figure 2I:
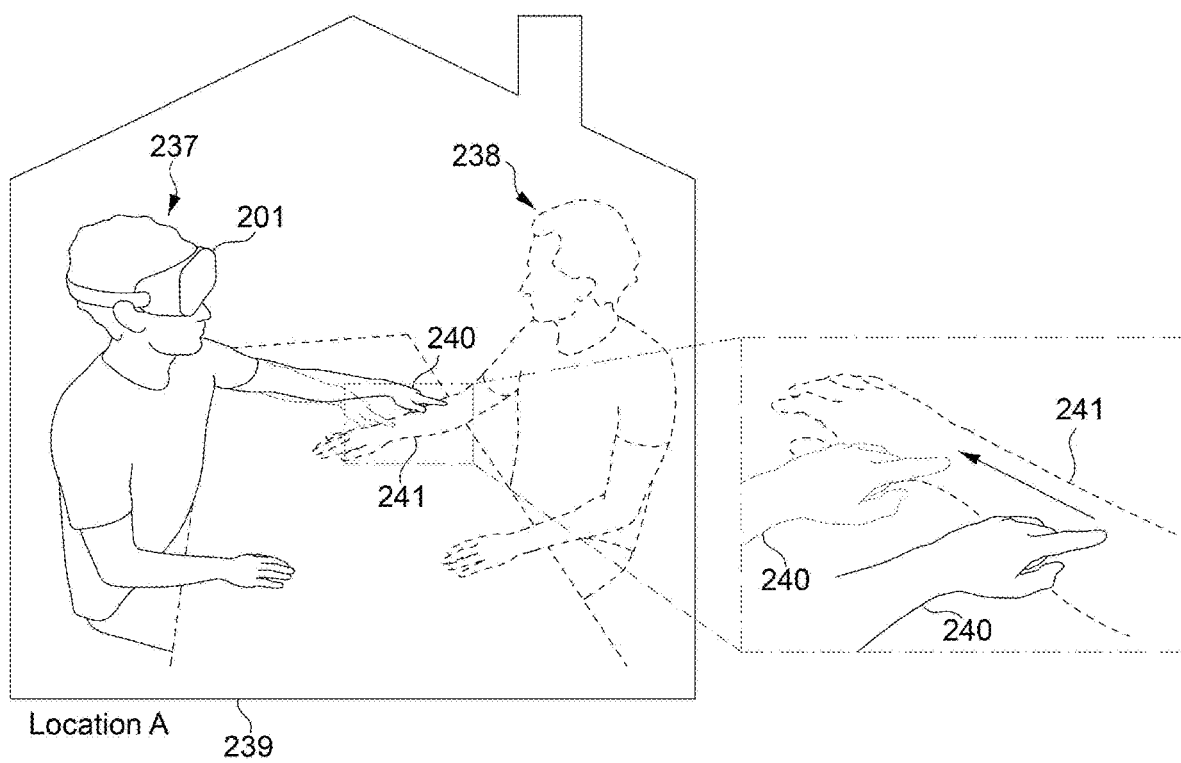
FIG. 2I shows a schematic view of a user with a haptic communication system in the form of a sleeve as described in a version of this invention.
Figure 2I:
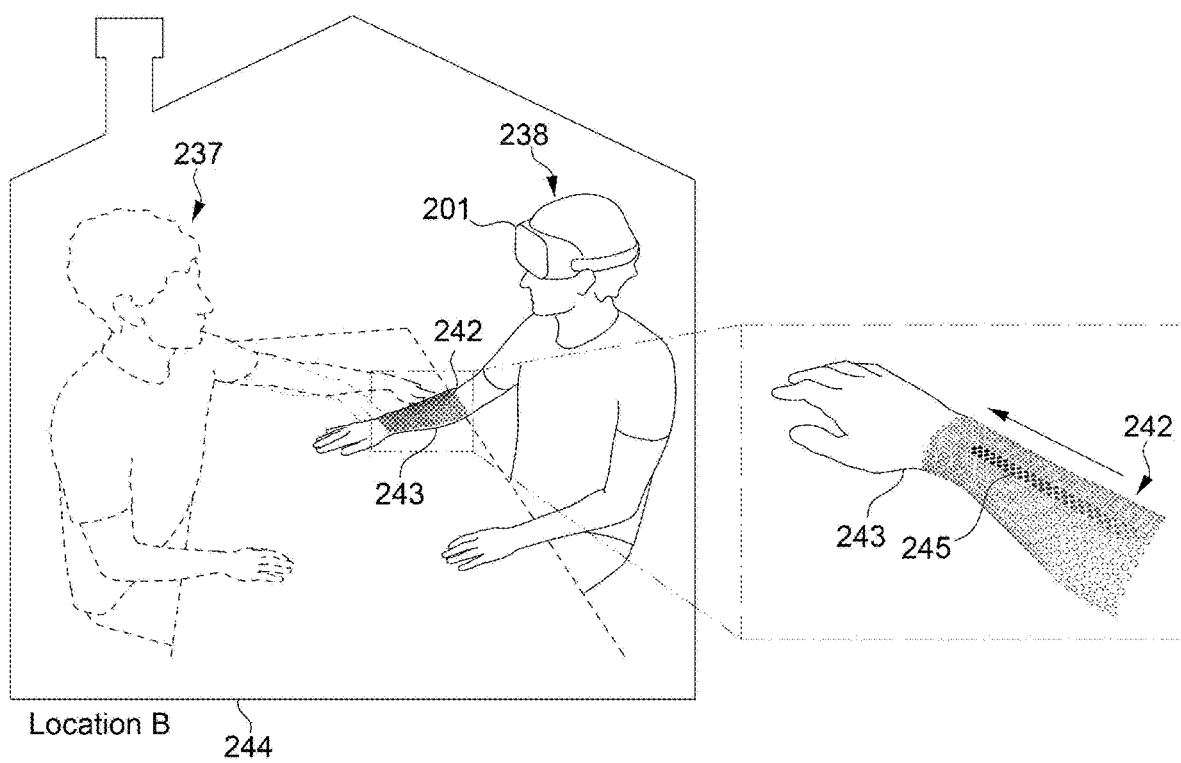

FIG. 2I is an example of remote sensory usage where one user 237 communicates a touch to another user 238 (i.e. tele-touch). Person A 237 at location A 239, interacting with Person B 238 inside of a virtual reality environment via a headset 201, traces a line with their left hand 240 onto Person B's virtual right arm 241. The traced line is relayed wirelessly to Person B 238 who is wearing the haptic device embodied as a sleeve 242 on their real right arm 243, and who is located at a different physical Location B 244 in the world. A pattern is tapped out 245 by the device onto Person B's real right arm 243. The pattern replicates the location and sequence of the original path traced by Person A 237 on Person B's 238 virtual right arm 241.

Figure 2J:
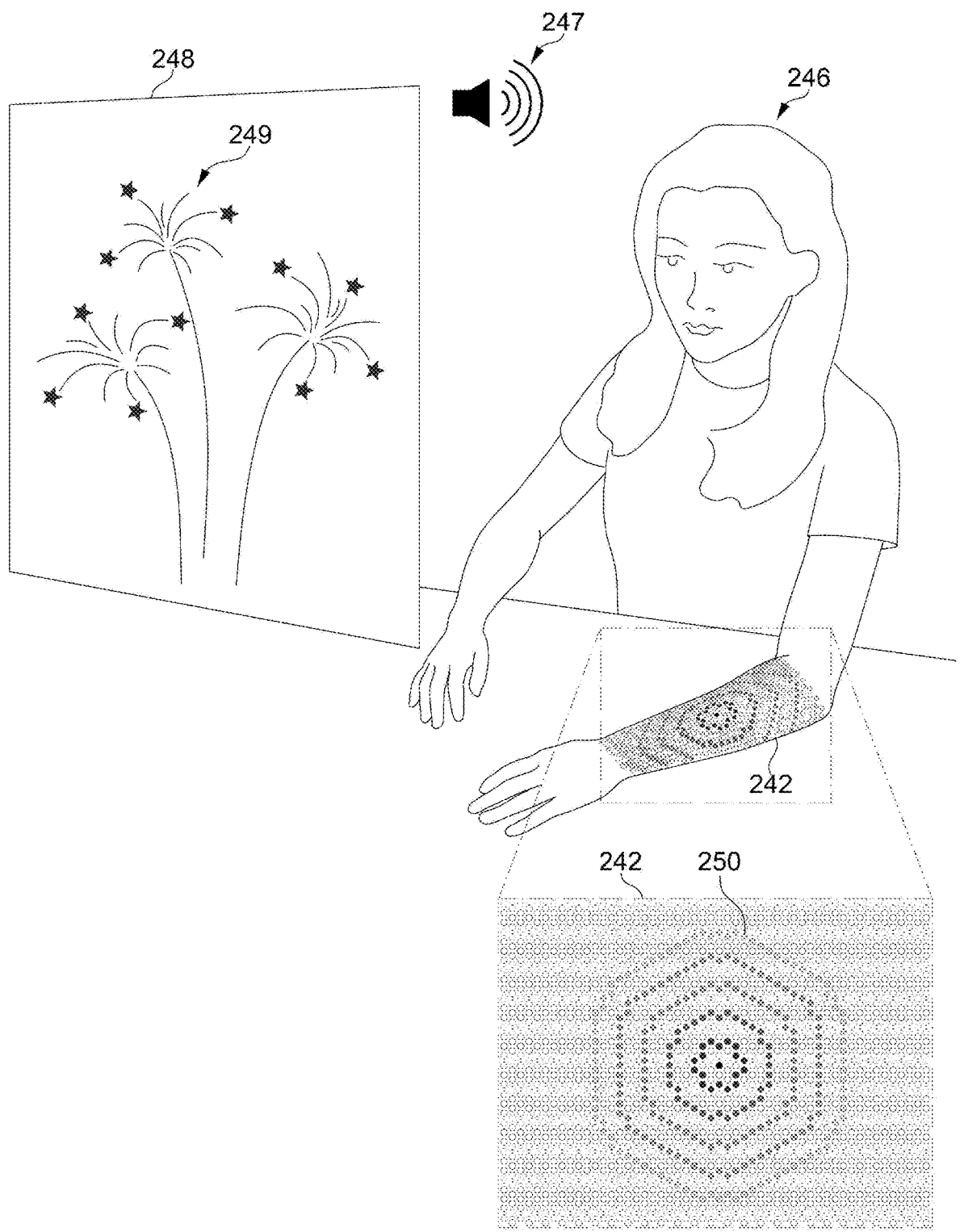
FIG. 2J shows a schematic view of a user with a haptic communication system in the form of a sleeve as described in a version of this invention.

In FIG. 2J, a person 246 experiences audio 247 and visual 248 input from a video of fireworks 249. The user 246 is wearing the haptic device embodied as a sleeve 242 and experiences a pattern tapped out 250 by the device that corresponds to the audio and visual input 104. In this case the pattern is a set of concentric rings radiating out from an origin point.

Figure 2K:
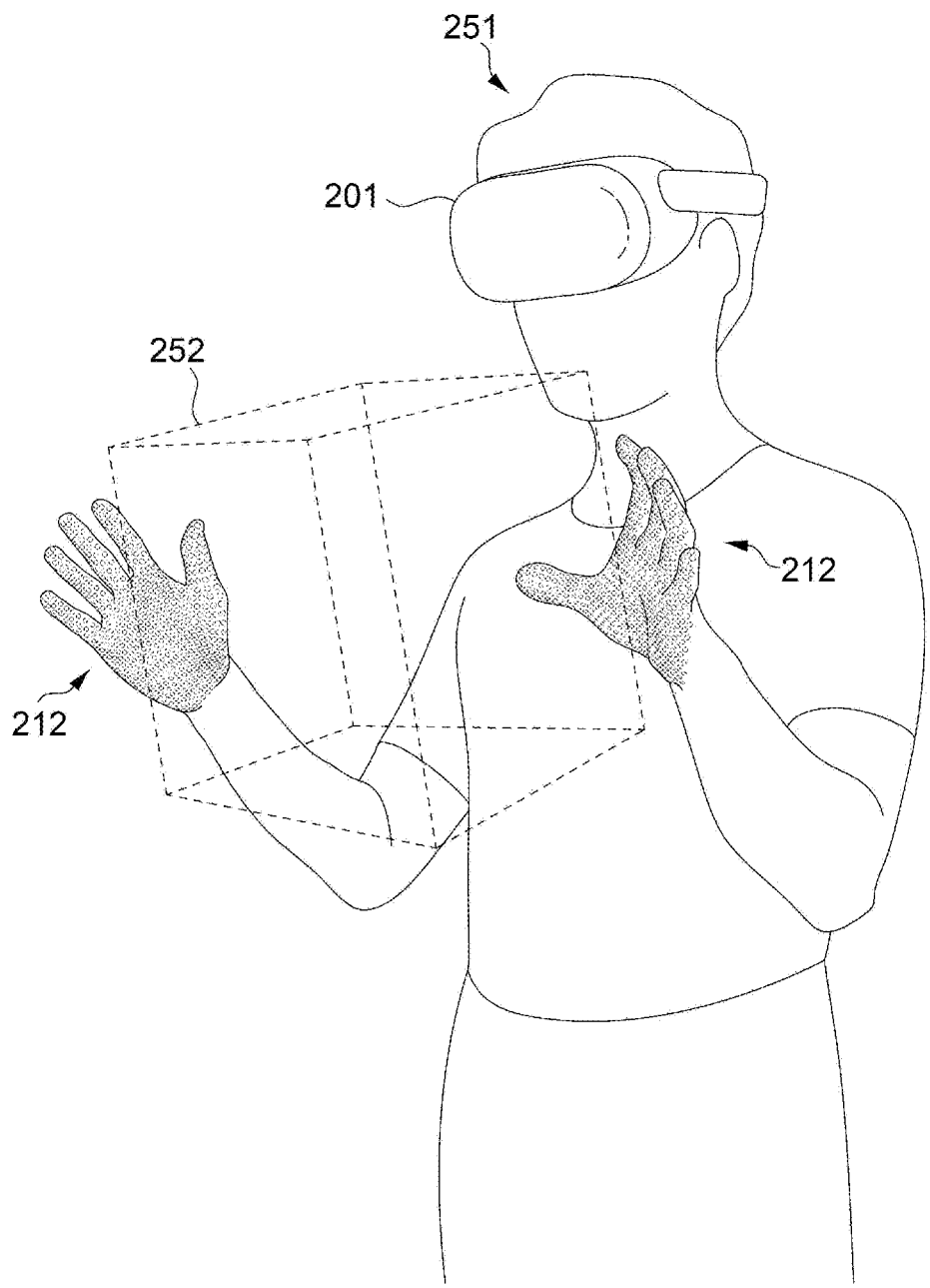
FIG. 2K shows a schematic view of a user with a haptic communication system in the form of a glove as described in a version of this invention.

In FIG. 2K, a person interacting in a virtual reality environment 251 via a headset 201, wearing the haptic device embodied as two gloves 212 interacts with a virtual cube 252. The user can feel the edges of the virtual reality cube through actuation in the gloves 212.

Figure 2L:
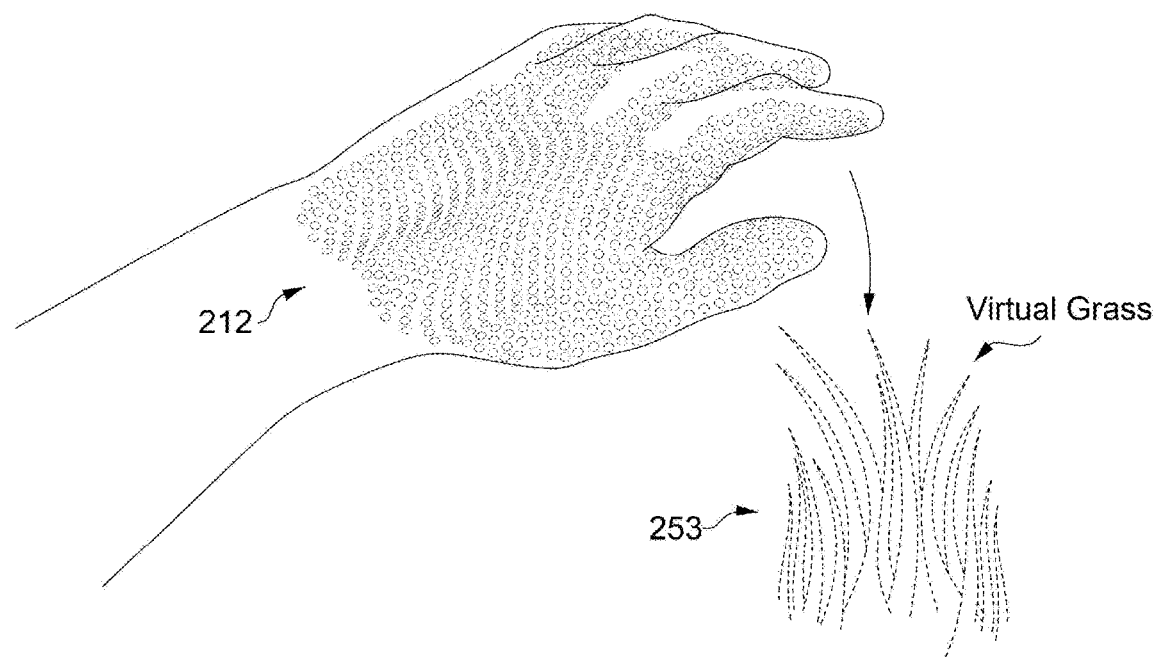
FIG. 2L shows a schematic view of a user with a haptic communication system in the form of a glove as described in a version of this invention.
Figure 2L:
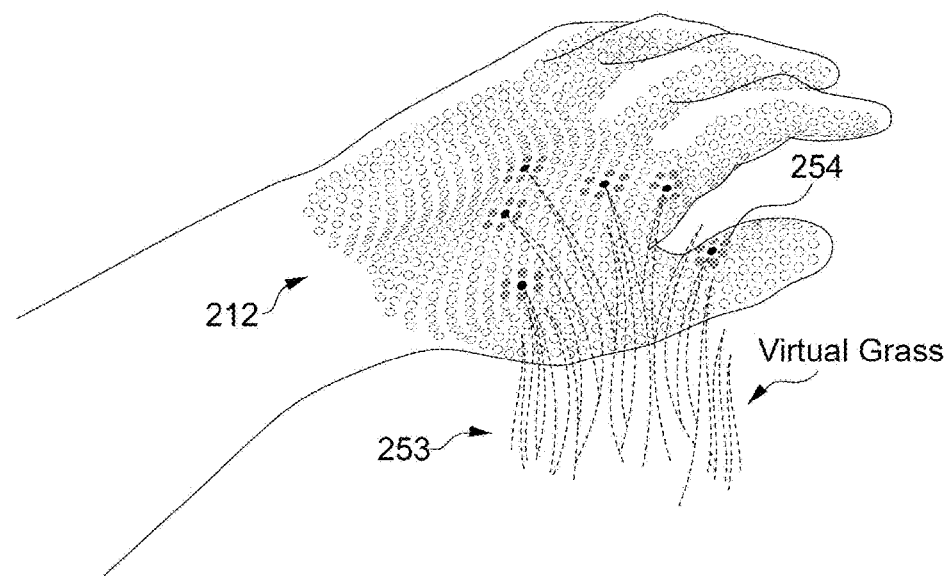

In FIG. 2L, a person wearing the haptic device embodied as a glove 212 is touching grass 253 in a virtual reality environment. The tips of the blades of grass can be felt by the user through actuation in the gloves 254.

FIG. 3A-G are schematic views of examples of haptic device 102 as a wearable device, or objects that incorporate haptic device 102 into its cover/casing. In some of these devices, the actuators 111 are mounted to a non-flexible casing and a flexible substrate is not required for haptic device 102. Haptic devices 102 are composed of up to thousands of actuators 111. The actuators 111 are shown and described in more detail in FIG. 5A-F.

Figure 3A:
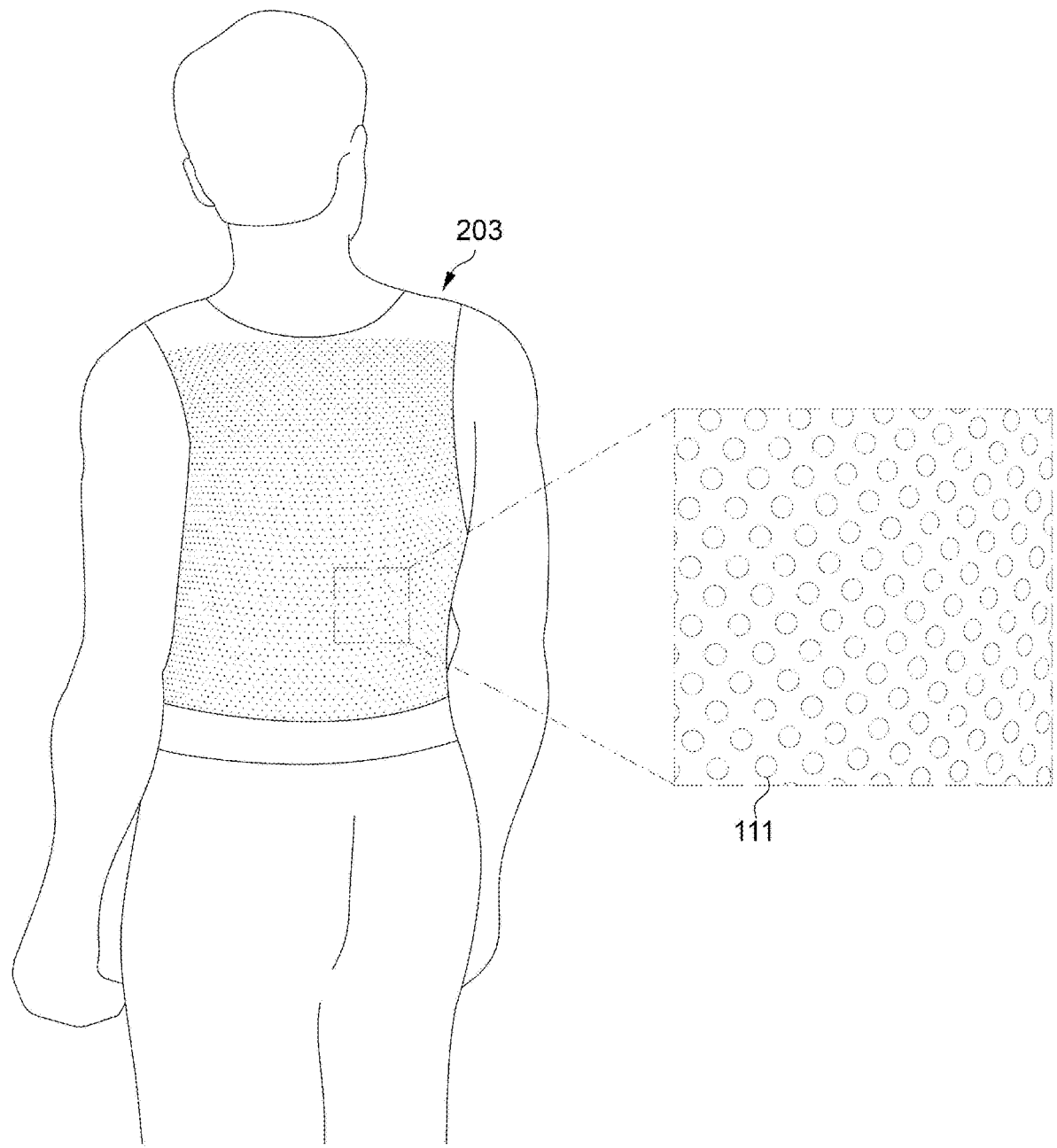
FIG. 3A shows a schematic view of a user with a haptic communication system in the form of a vest as described in a version of this invention.

FIG. 3A depicts a vest 203 with actuators 111.

Figure 3B:
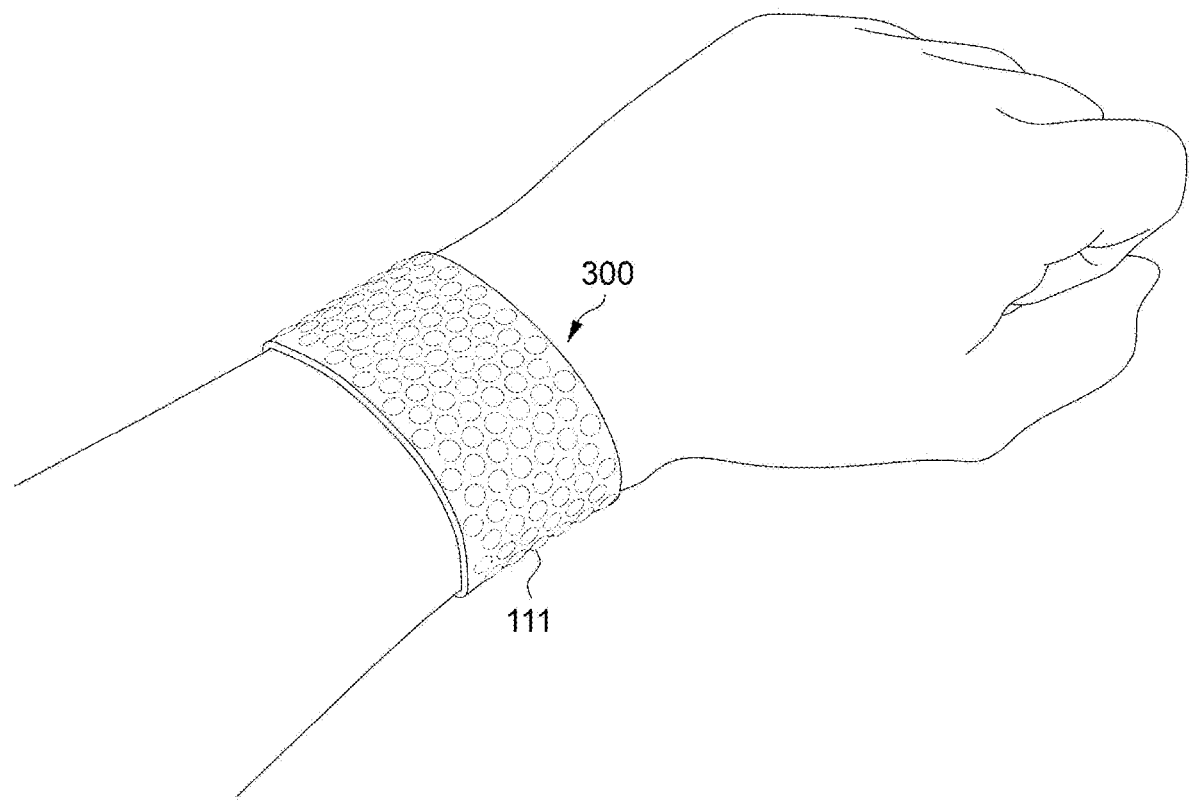
FIG. 3B shows a schematic view of a user with a haptic communication system in the form of a wrist strap as described in a version of this invention.

FIG. 3B depicts a wristband 300 with actuators 111.

Figure 3C:
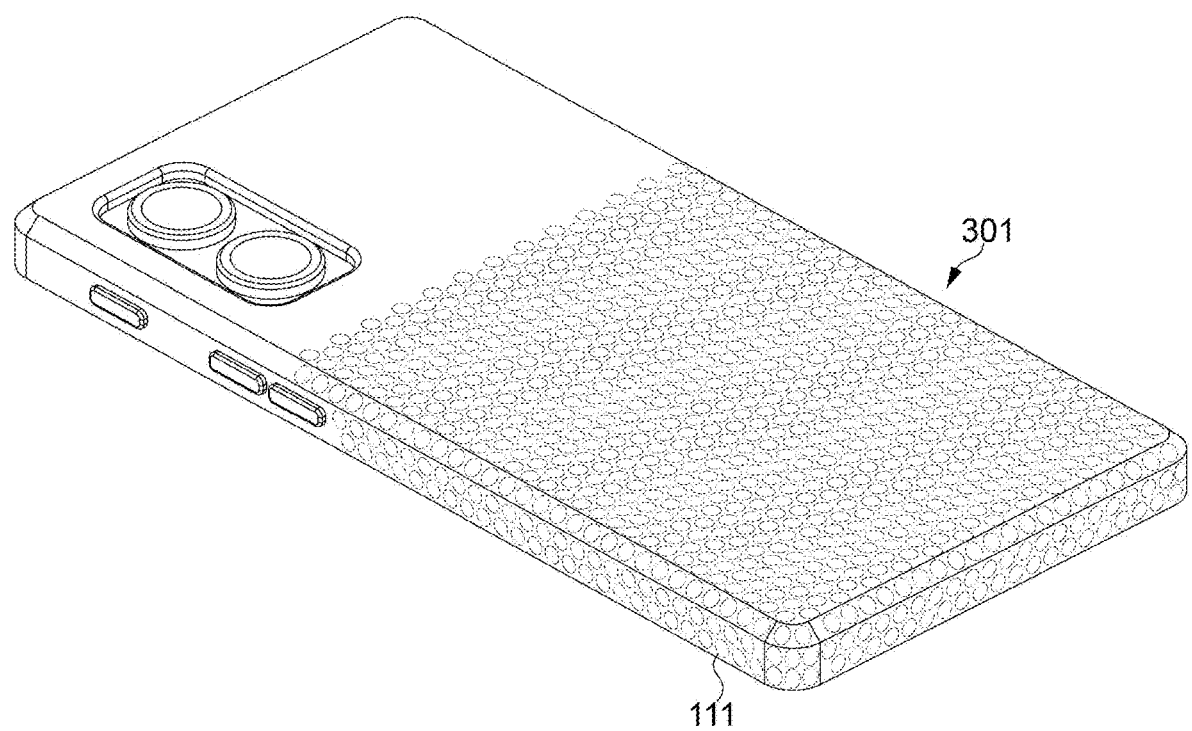
FIG. 3C shows a schematic view of a haptic communication system in the form of a phone case as described in a version of this invention.

FIG. 3C depicts a mobile phone case 301 with actuators 111 on the bottom half of the case where a user's grip is usually located.

Figure 3D:
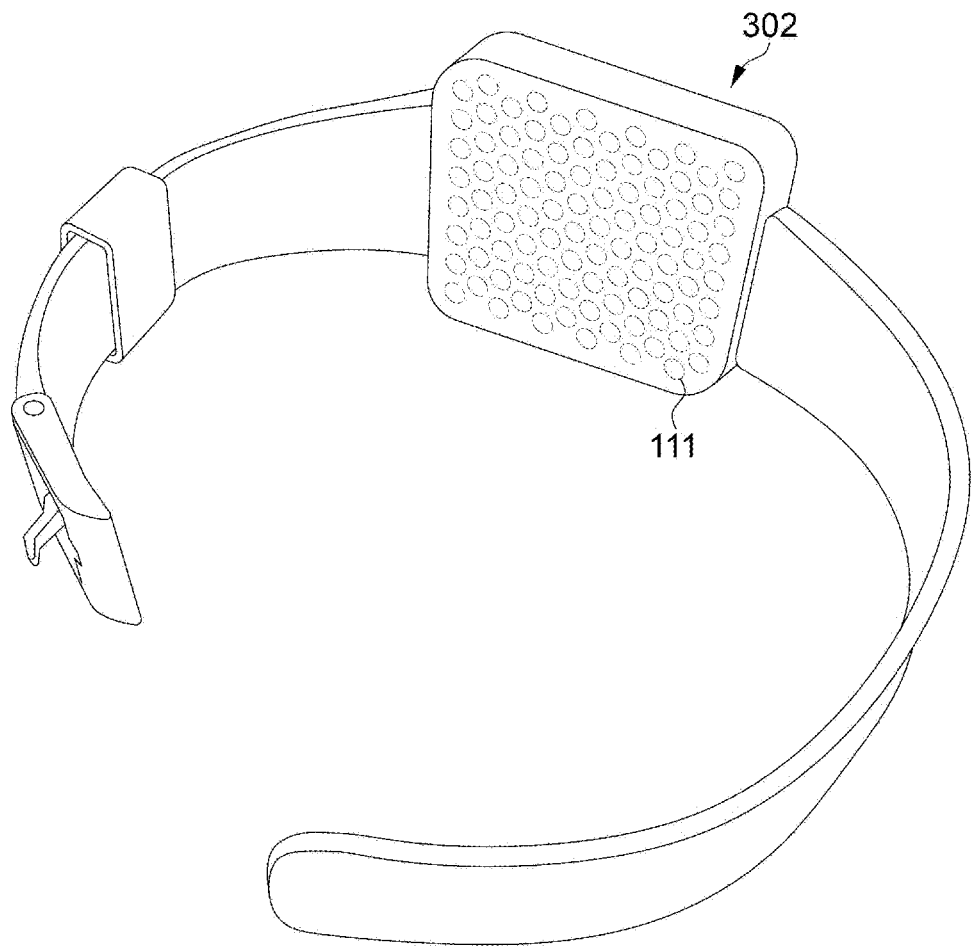
FIG. 3D shows a schematic view of a haptic communication system in the form of a watch as described in a version of this invention.

FIG. 3D depicts a wristwatch 302 with actuators 111 on the back of the watch face.

Figure 3E:
FIG. 3E shows a schematic view of a haptic communication system in the form of a game controller as described in a version of this invention.

FIG. 3E depicts a video game controller 303 with actuators 111 in the two handles.

Figure 3F:
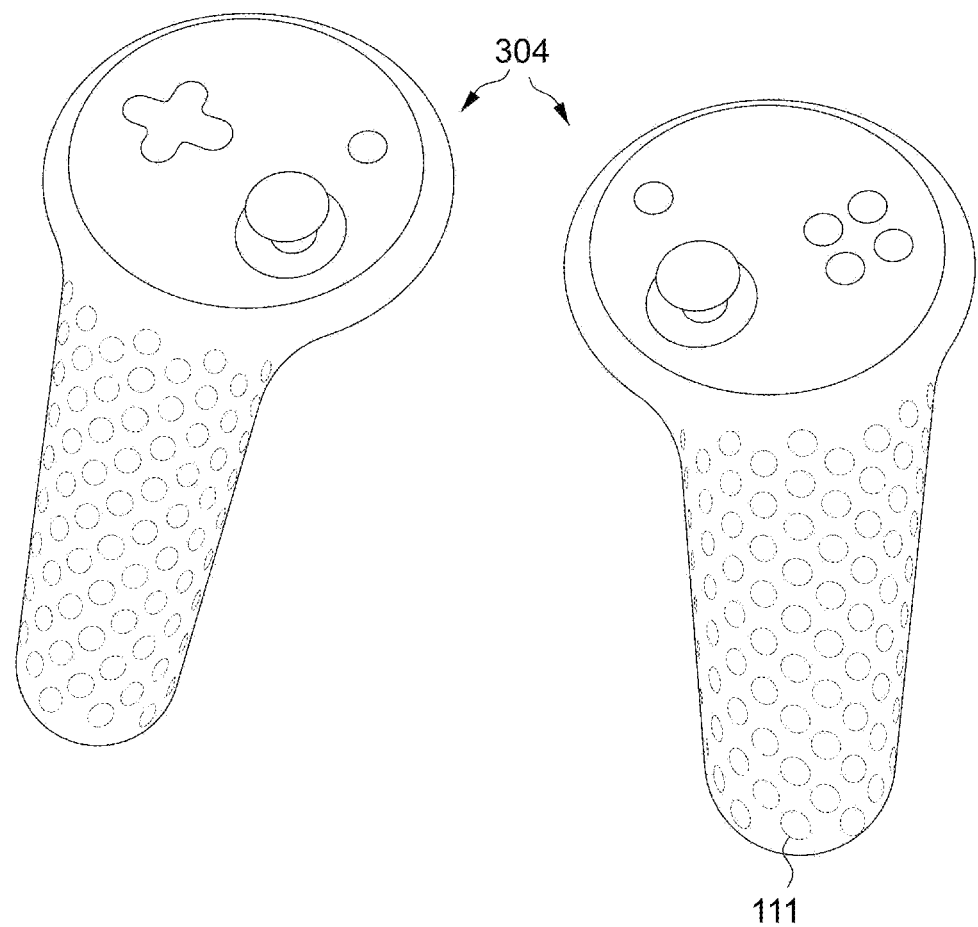
FIG. 3F shows a schematic view of a haptic communication system in the form of a virtual reality game controller as described in a version of this invention.

FIG. 3F depicts a virtual reality video game controller 304 with actuators 111 in the handles.

Figure 3G:
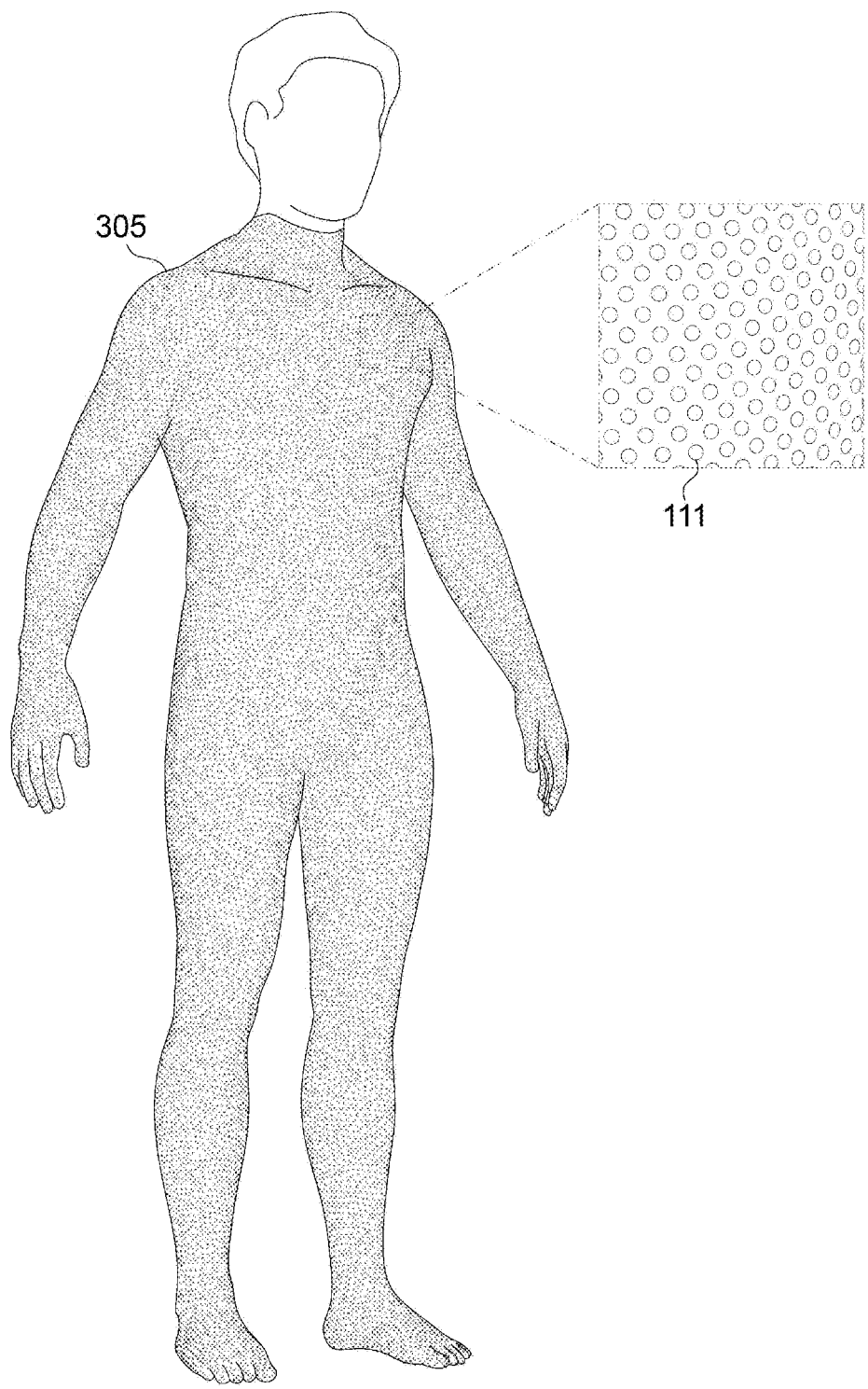
FIG. 3G shows a schematic view of a user with a haptic communication system in the form of a body-suit as described in a version of this invention.

FIG. 3G depicts a full-body suit 305 with actuators 111 across the entire surface area of the suit.

FIG. 4A-E depicts system 100 with haptic device 102 comprising a thin flexible mesh 400 of densely packed actuators 111. The actuators are mounted onto a thin substrate 401 that incorporates electrical wiring to allow each actuator to be separately powered on. Preferably, this substrate takes the form of a flexible and/or stretchable printed circuit board. The actuators are mounted to substrate 401 with an electrically conductive adhesive that creates both a mechanical and electrical bond between each actuator 111 and the substrate 401.

The haptic device 102 in FIG. 4A-E is the building block of the devices demonstrated in FIG. 3A-G. The individual actuators 111 are depicted in FIG. 5A-F.

Figure 4A:
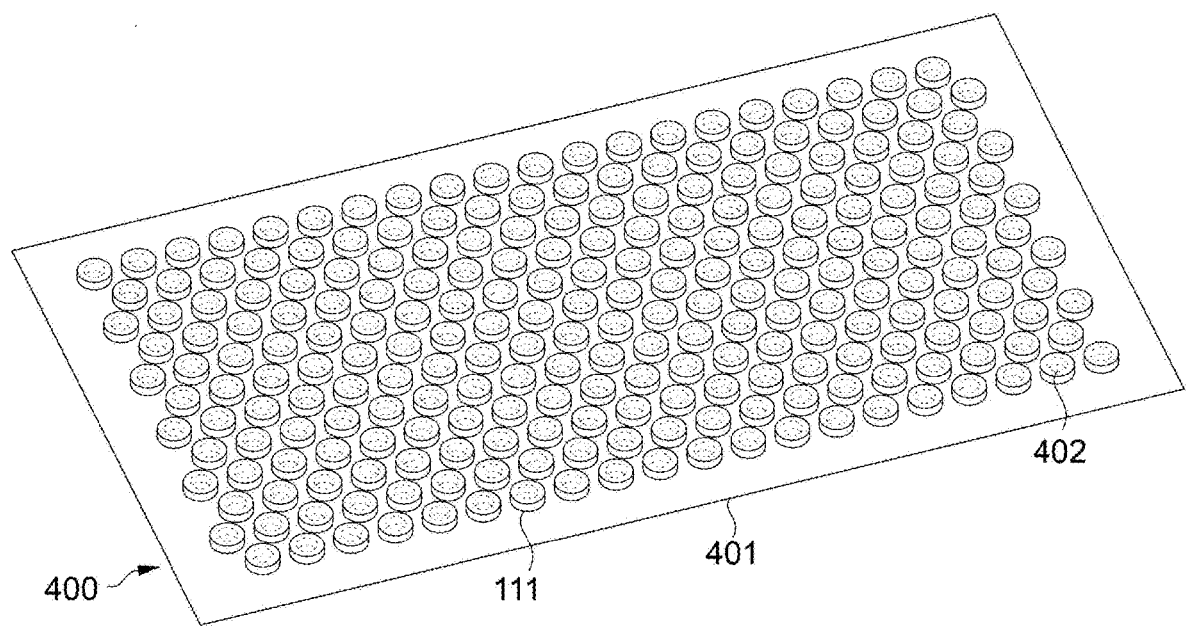
FIG. 4A shows a schematic perspective view of a skin touching first side of a haptic device as described in a version of this invention.

FIG. 4A depicts the skin-touching side of the sheet of actuators 111. It should be understood that "skin-touching" means direct contact with the surface of the skin or indirect contact (such as through an item of clothing) that is capable of being felt by the user. Each actuator 111 is covered by a cap made from a thin, stretchable material 402.

Figure 4B:
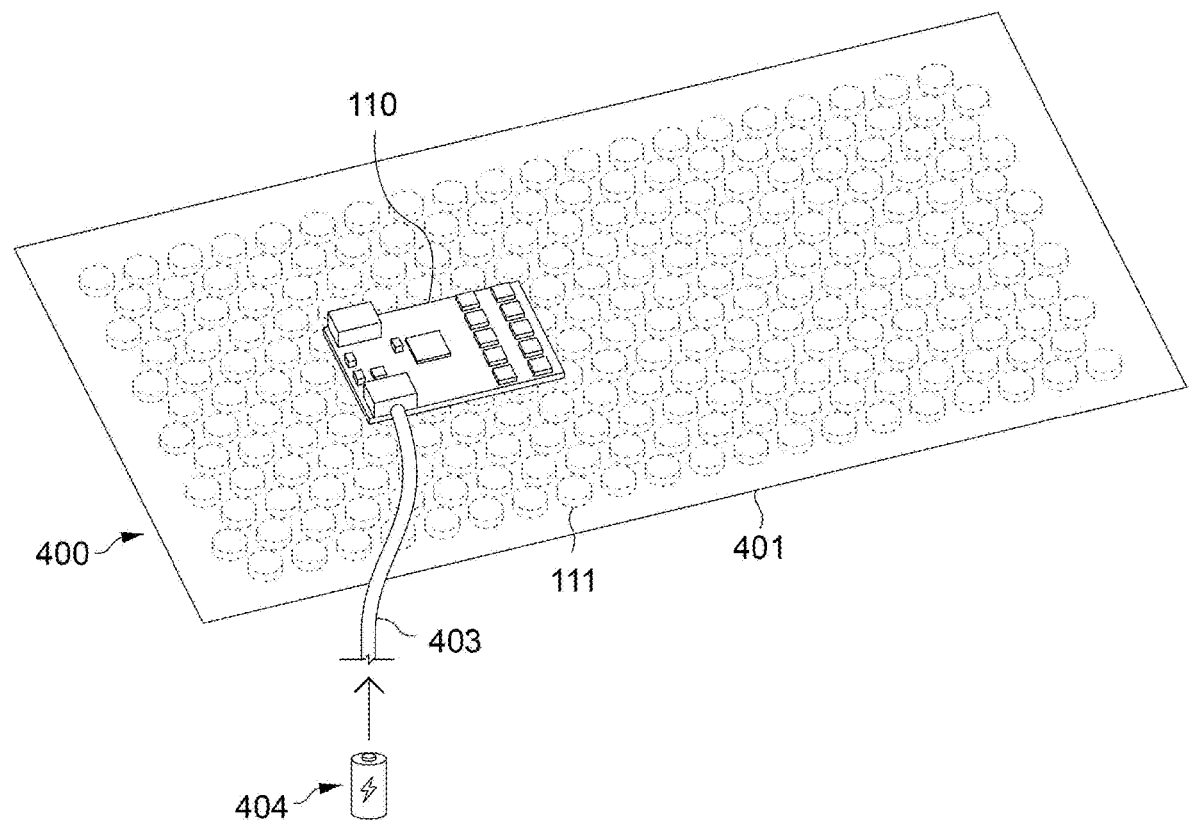
FIG. 4B shows a schematic perspective view of a second side of the haptic device depicted in FIG. 4A.

FIG. 4B depicts the opposite side of the sheet of actuators 111 from FIG. 4A. This side may house the controller 110, powered through a cable 403 by an external power source 404. Alternatively, controller 110 may be located remotely from the sheet of actuators 111. The controller 110 controls which actuator 111 at any one point in time receives electrical current for a specified duration. It receives commands from the processing device 101 regarding the strength of the taps, speed of tracing and width of tracing lines to execute the haptic message 107 of the system 100 as shown in FIG. 1A.

Figure 4C:
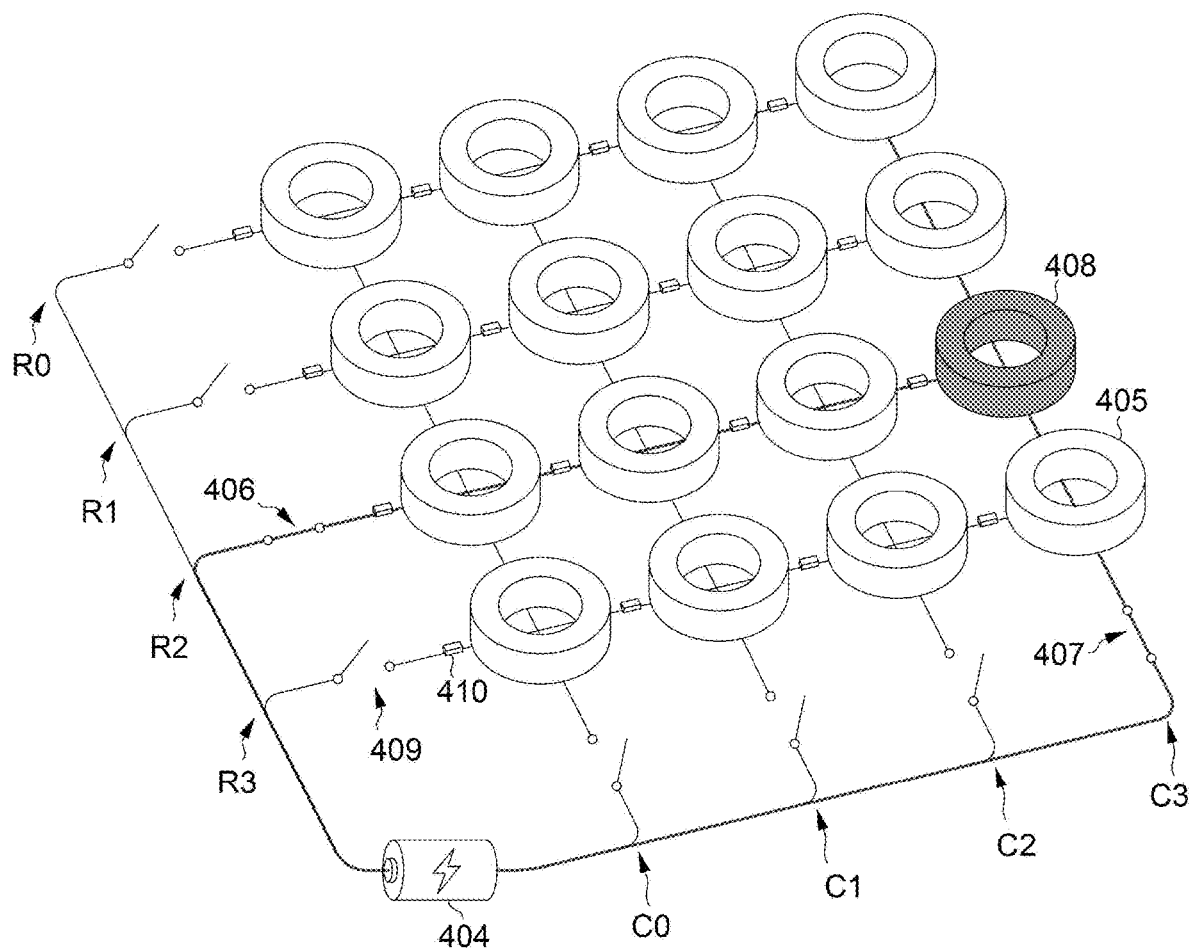
FIG. 4C shows an enlarged schematic perspective view of the electronic circuitry embedded in the haptic device depicted in FIG. 4A.

FIG. 4C depicts the circuitry of a matrix design (row and column arrangement) necessary to individually power each actuator sequentially. Note that this figure features a simplified physical arrangement of actuators (rectangular grid) compared to the arrangement of actuators in FIG. 4A and FIG. 4B (hexagonal grid). This difference is in physical appearance only, and the underlying circuitry that powers the examples in all three figures is the exact same. In this example, there are four rows R0, R1, R2, R3 and four columns C0, C1, C2, C3 and each actuator (for example 405) is connected to a specific unique intersection of a row and column. In the moment illustrated by FIG. 4C, R2 and C3 are connected to a power source 404 via route 406 and 407 respectively. Actuator 408 at the intersection of R2 and C3 is activated (shaded). The neighbouring actuator 405 is at the intersection of R3 and C3, but R3 is not connected to the power source (via route 409) and thus actuator 405 remains unpowered (unshaded). This design example has one diode 410 per actuator, preventing current leakage and unintended activation. Such diodes could also serve to provide additional information to the user (or system developer) by emitting light when activated.

Figure 4D:
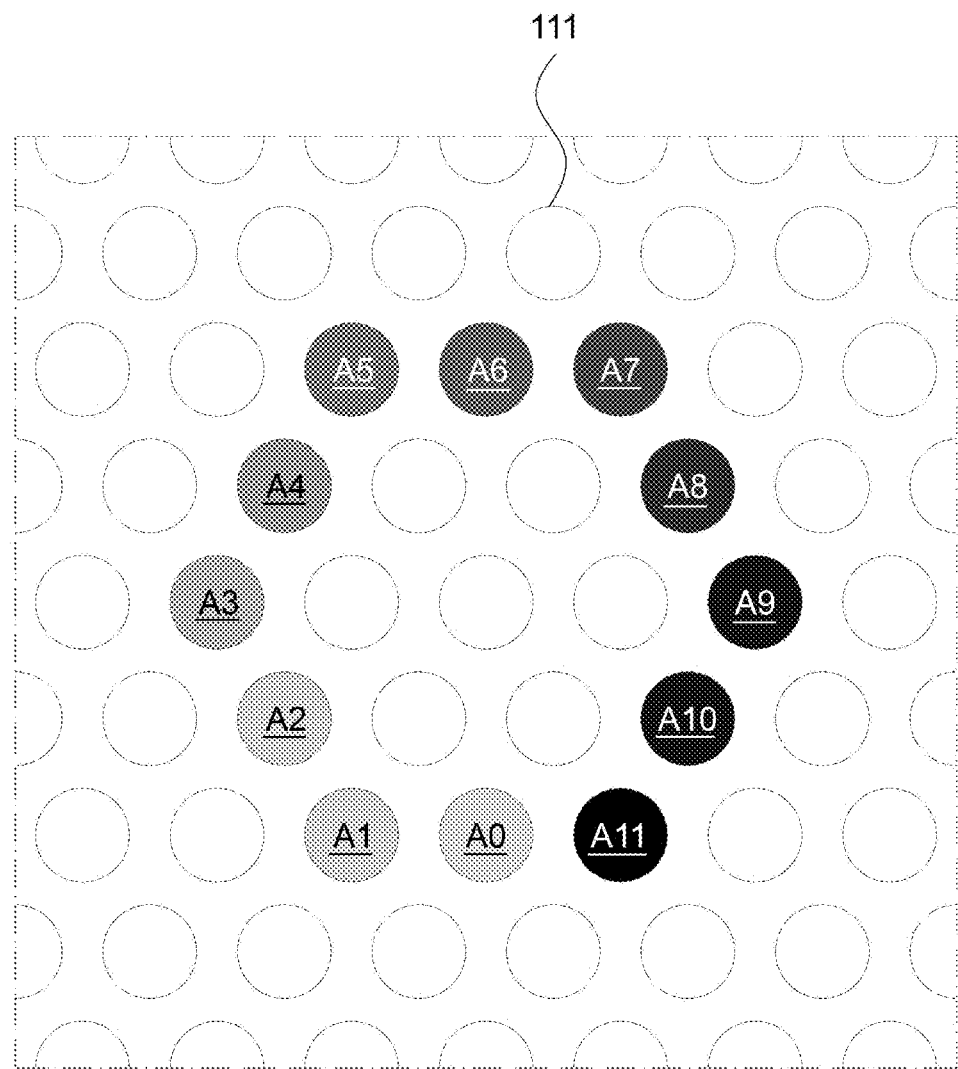
FIG. 4D shows a schematic view of the sequential actuation of the actuators in the haptic device as described in a version of this invention.

FIG. 4D depicts a simplified top down view of a small section of haptic device 102. Starting from actuator A0 and ending with A11, the haptic device 102 sequentially powers on actuators to trace out a pattern, which in this example is a hexagon. In this example, the actuators are powered on in the following order: A0, A1, A2, A3, A4, A5, A6, A7, A8, A9, A10, A11. The actuator marked with the darkest hatch A11 represents the actuator that was powered on most recently, while the actuator with the lightest hatch A0 represents the actuator that was powered on first.

Figure 4E:
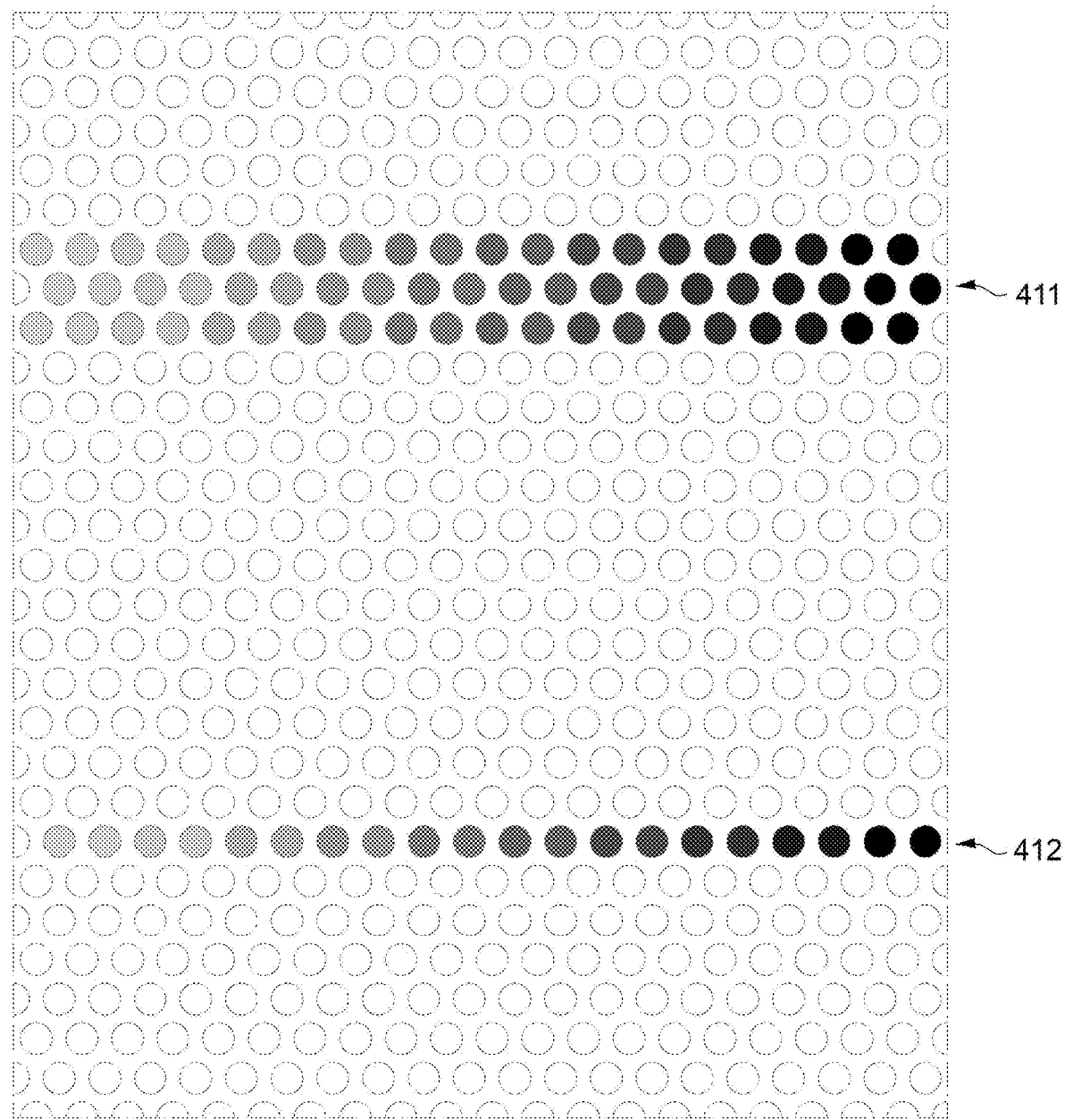
FIG. 4E shows a schematic view of various pattern thicknesses traced by the haptic device.

FIG. 4E depicts a simplified top down view of a small section of haptic device 102. Pattern 411 depicts a line that has been traced which has a thickness of three actuators. Pattern 412 depicts a line that has been traced which has a thickness of a single actuator. In both cases, the lines have been traced starting from the left side of the actuator array toward the right side. With reference to FIG. 4D, the actuators marked with the darkest hatch represent the actuators that were powered on most recently, while those with the lightest hatch represent the actuators that were powered on first.

FIG. 5A-F depicts detailed views of versions of the individual actuators 111 composing haptic device 102 (demonstrated in FIG. 4).

Figure 5A:
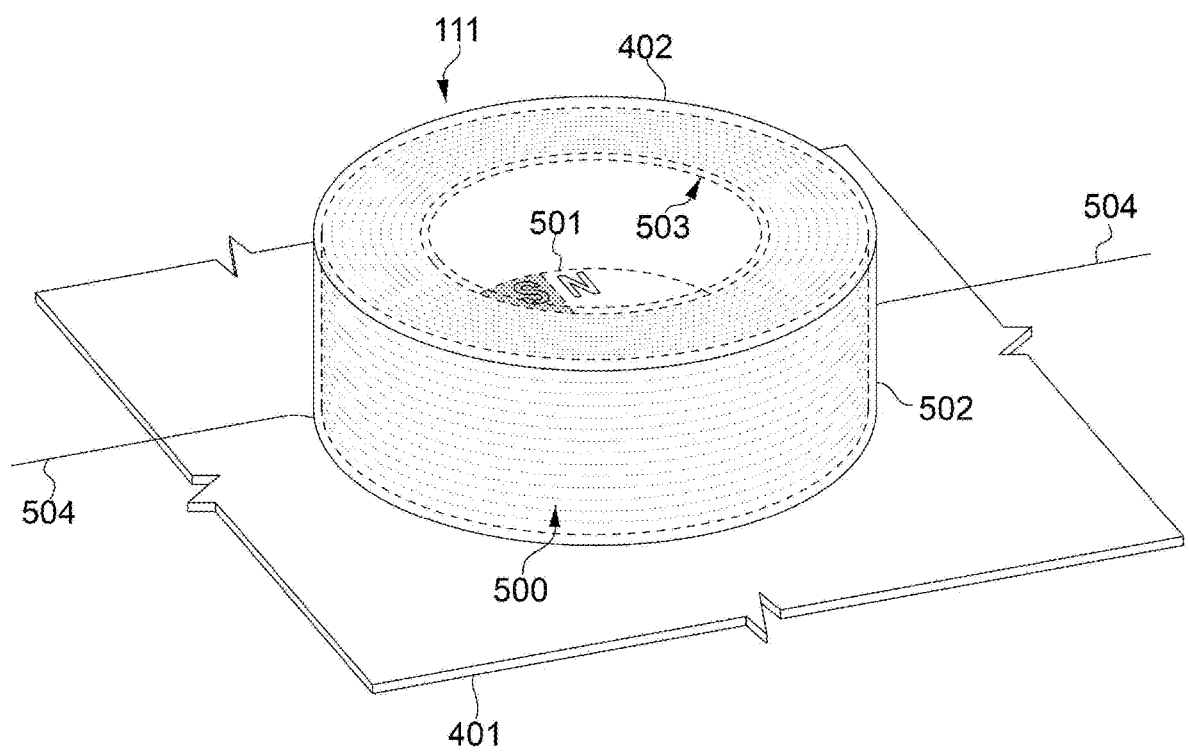
FIG. 5A shows a schematic perspective view of an actuator for a haptic communication system as described in a version of this invention.

FIG. 5A depicts a 3D representation of a single actuator 111. The actuator is mounted to a thin, flexible and stretchable substrate 401 and is composed of a voice-coil electromagnet 500 made with magnet wire, and a permanent disc magnet 501 located freely inside the coil. This creates what is known in the field as a MMVCA (moving magnet voice coil actuator). The actuator is capped with a very thin, soft, and stretchable material 402 at the open end of the coil (skin touching side). This material additionally covers both the exterior 502 and interior 503 side surfaces of the coil to prevent the insulation on the magnetic coil wiring from wearing out over many cycles of actuation. The actuator is powered through the two ends of the magnet wire 504 that make up the electromagnetic coil. Current can be applied to the coil to induce the magnet to move so that it taps the skin. The duration the current is applied is typically between 0.1 to 2.0 milliseconds and can be controlled to vary the perceived strength of the tap. Note this is a non-vibratory, localized and precise tap. Current can also be pulsed to the same coil with a controllable off time to create a sensation of vibration.

Figure 5B:
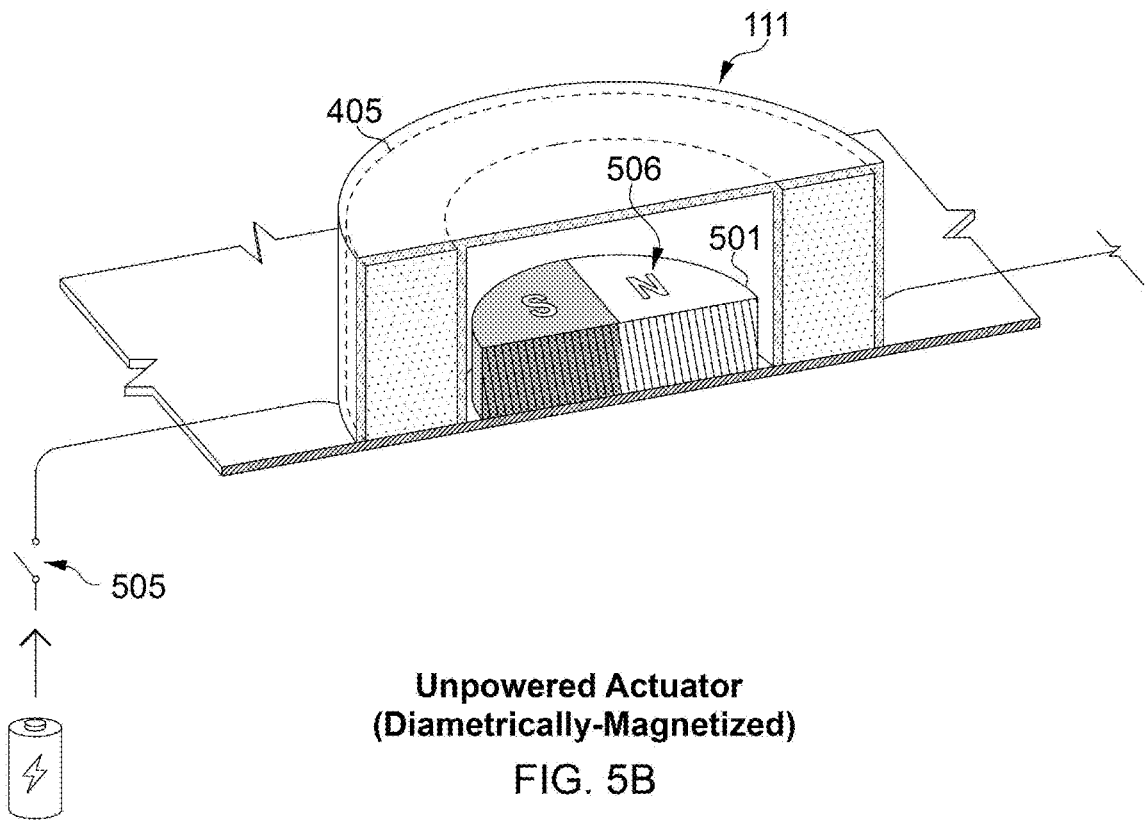
FIG. 5B shows a sectional view of the haptic communication system depicted in FIG. 5A in an unpowered state.

FIG. 5B depicts a cross-section of the single actuator 111 of FIG. 5A in an unpowered state 505. The polarity of the disc magnet 501 is horizontal aka diametrically magnetized 506. In this state, the magnet 501 lies in the same plane as the unpowered coil 405 and does not deform the stretchable material that encapsulates the open ends of the magnet coil. It is important to note that this version's dimensions are already small enough to convey the novelty of the haptic micro-array. The current arrays feature a 4 mm to 6 mm actuator size on a 5 mm to 8 mm spaced hexagonal grid. Other versions could have smaller or slightly larger dimensions.

Figure 5C:
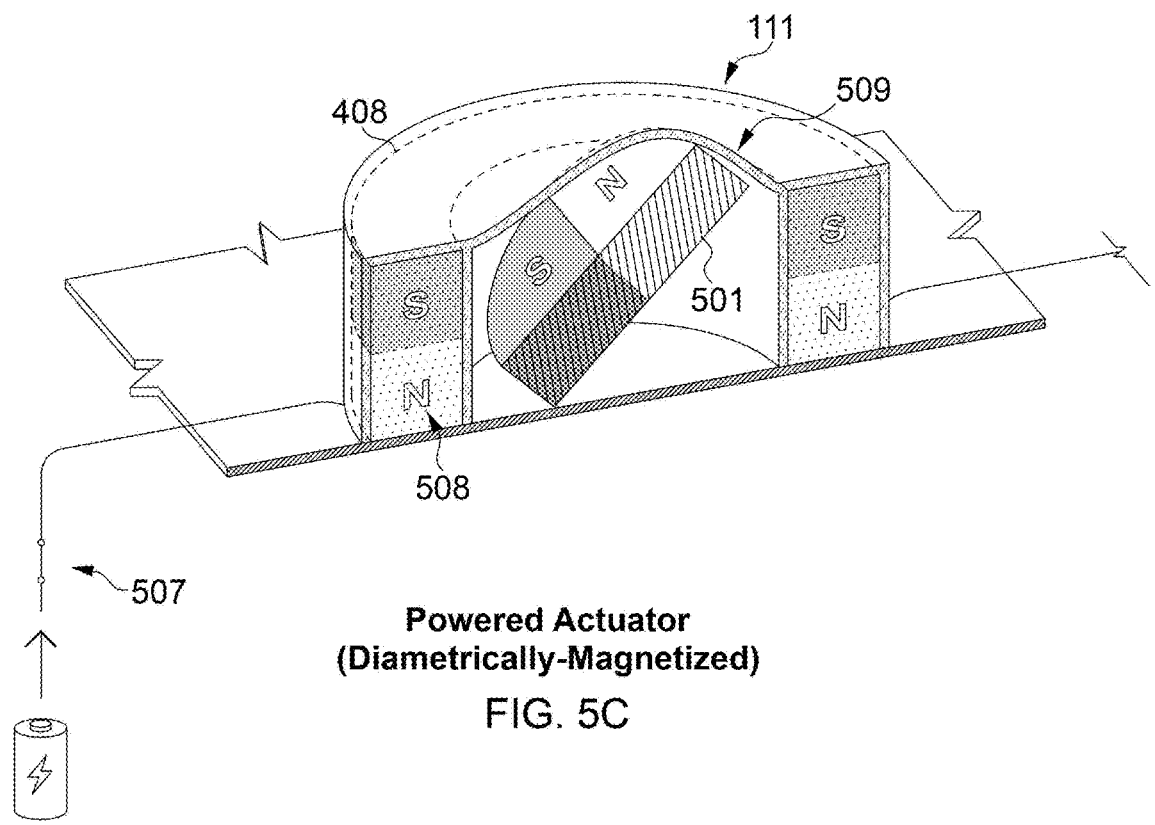
FIG. 5C shows a sectional view of the haptic communication system depicted in FIG. 5A in a powered state.

FIG. 5C depicts a cross-section of the single actuator 111 from FIG. 5B in a powered state 507. The powered coil 408 generates a magnetic field 508, which causes the disc magnet 501 to pivot and deform 509 the stretchable material that caps the coil. This creates the tap of the individual actuator.

The characteristic of a tap in the context of this invention is a non-vibratory, localized and precise tap on the skin. It is preferably the smallest and lightest possible contact with the skin to still achieve a reliable perception of the touch and the dynamic trace (using a series of actuators as in FIG. 4D and FIG. 5G).

Figure 5D:
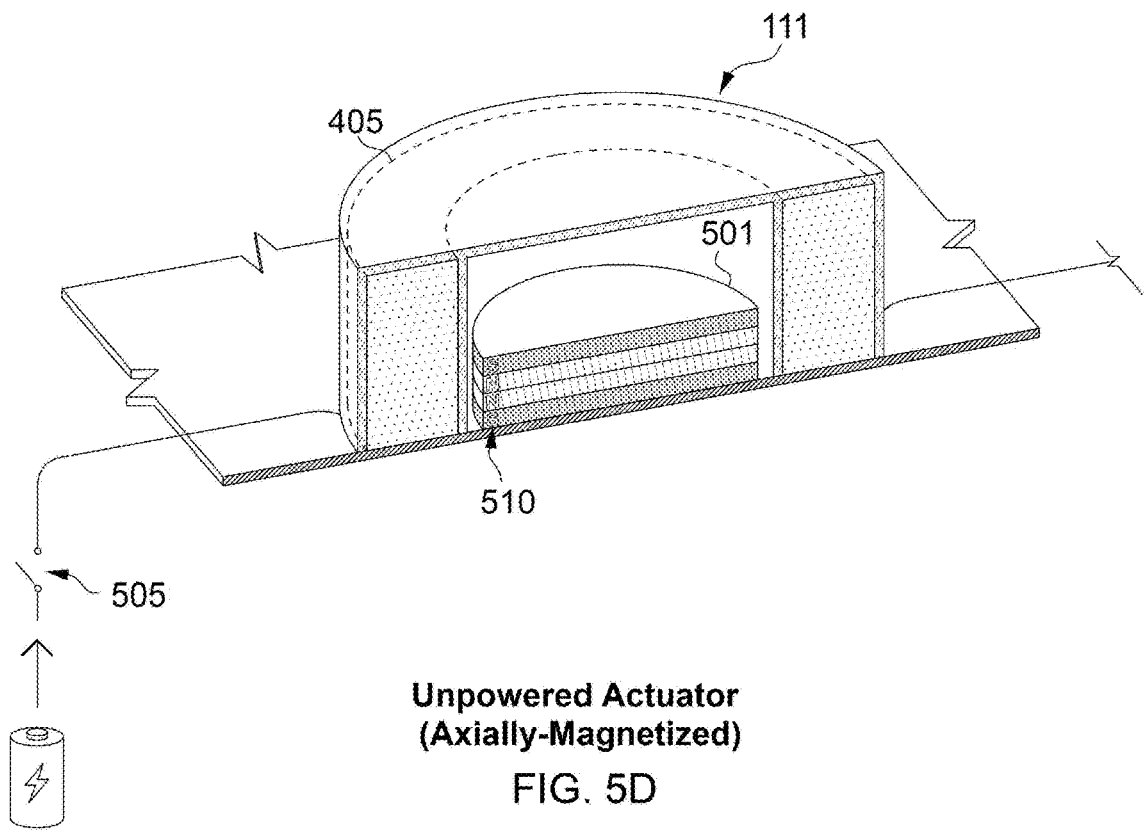
FIG. 5D shows a schematic sectional perspective view of another embodiment of an actuator for a haptic communication system in an unpowered state as described in a version of this invention.

FIG. 5D depicts a cross-section of a second design of a single actuator 111 in an unpowered state 505. The disc magnet 501 consists of a pair of axially magnetized 510 magnets that are stacked axially, one on top of the other. In this state, the magnet 501 lies in the same plane as the unpowered coil 405 and does not deform the stretchable material that encapsulates the open end of the magnet coil.

Figure 5E:
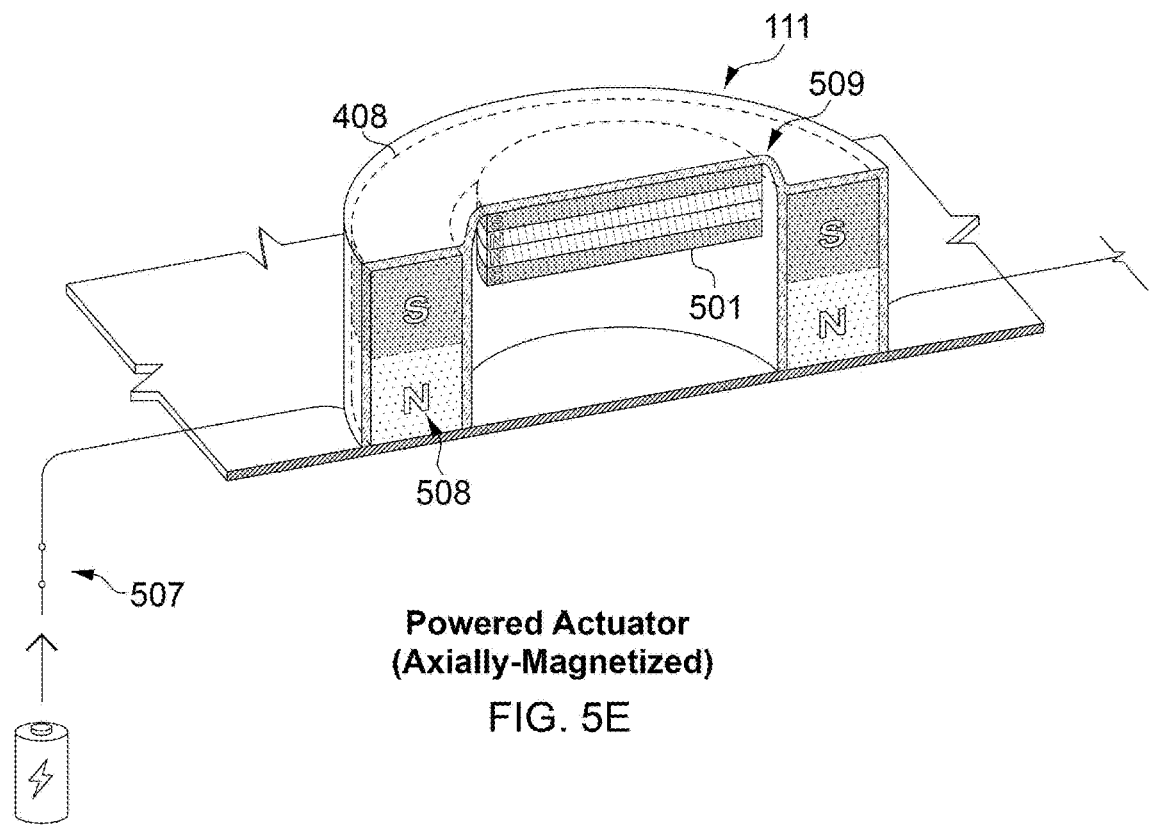
FIG. 5E shows a schematic sectional perspective view of the actuator depicted in FIG. 5E in a powered state.

FIG. 5E depicts a cross-section of the single actuator 111 from FIG. 5D in a powered state 507. The powered coil 408 generates a magnetic field 508, which causes the disc magnet 501 to move to a position slightly proud of the top of the coil and deform 509 the stretchable material that caps the exterior of the coil. This creates the tap of the individual actuator.

Figure 5F:
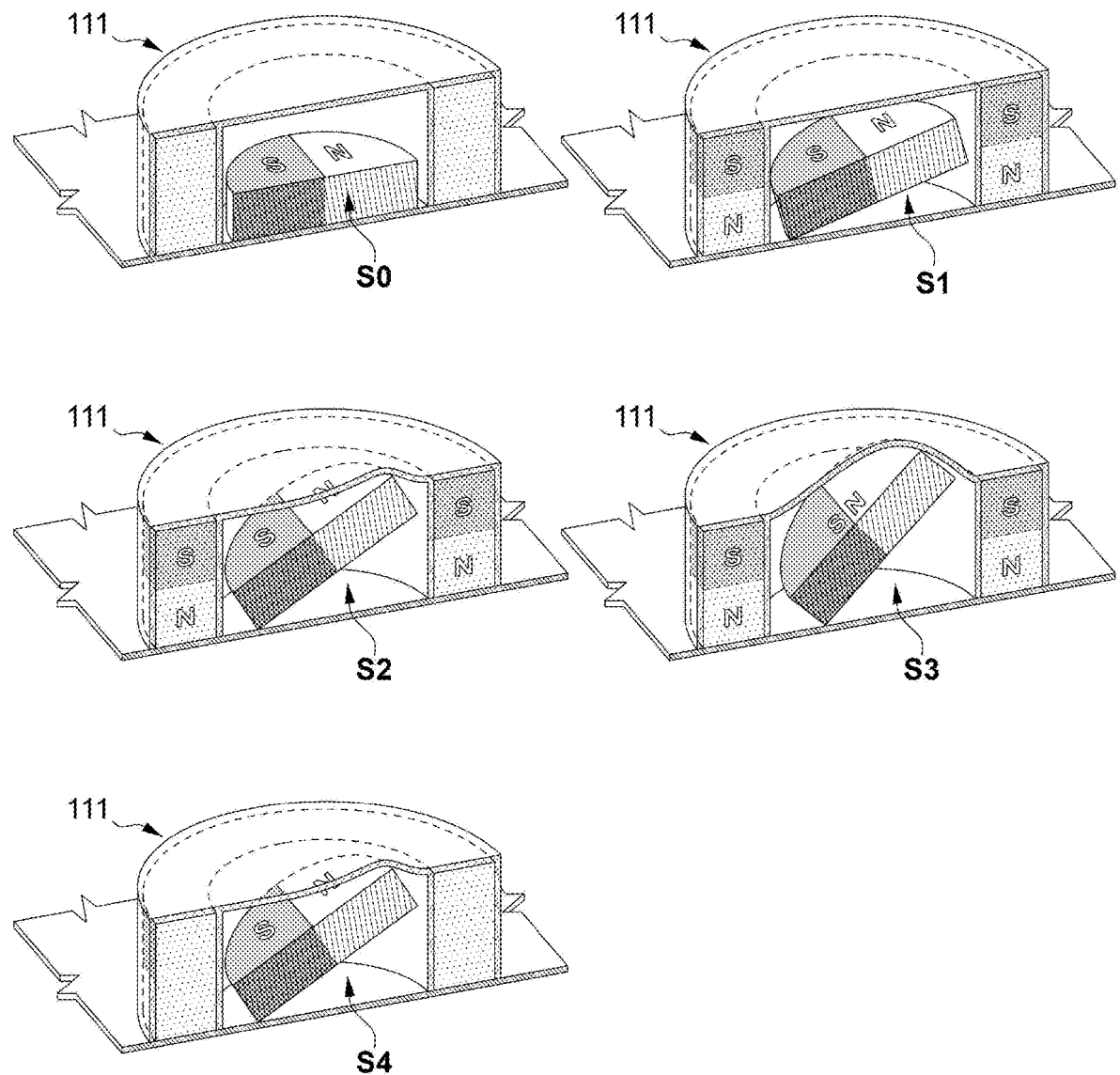
FIG. 5F shows a sectional view of the haptic communication system depicted in FIG. 5A showing the same actuator at different stages in its actuation cycle.

FIG. 5F depicts the cross-section of a single actuator 111 at the 5 different stages (S0, S1, S2, S3, S4) in its actuation cycle. The disc magnet 501 inside of actuator 111 in this specific example is diametrically magnetized 506 similar to FIG. 5B and FIG. 5C.

Actuator 111 at stage S0 has not been powered on yet, and the magnet 501 inside of the actuator remains stationary.

Actuator 111 at stage S1 has just been powered on. The magnet 501 inside of the actuator begins to pivot, but has not yet deformed the stretchable material above the coil.

Actuator 111 at stage S2 is in the middle of being powered on. The magnet 501 inside of the actuator is near the midpoint of its rotation and has started to deform the stretchable material above the coil.

Actuator 111 at stage S3 is in the last moments of receiving power in its actuation cycle. The magnet 501 inside of the actuator is at its maximum point of rotation and deforms the stretchable material above the coil to produce a tap on the skin.

Actuator 111 at stage S4 has just stopped receiving power. The magnet 501 inside of the actuator begins to fall back to its original position. Once the magnet stops deforming the stretchable material above the coil, it is ready to receive power again to generate a new tap on the skin.

Figure 5G:
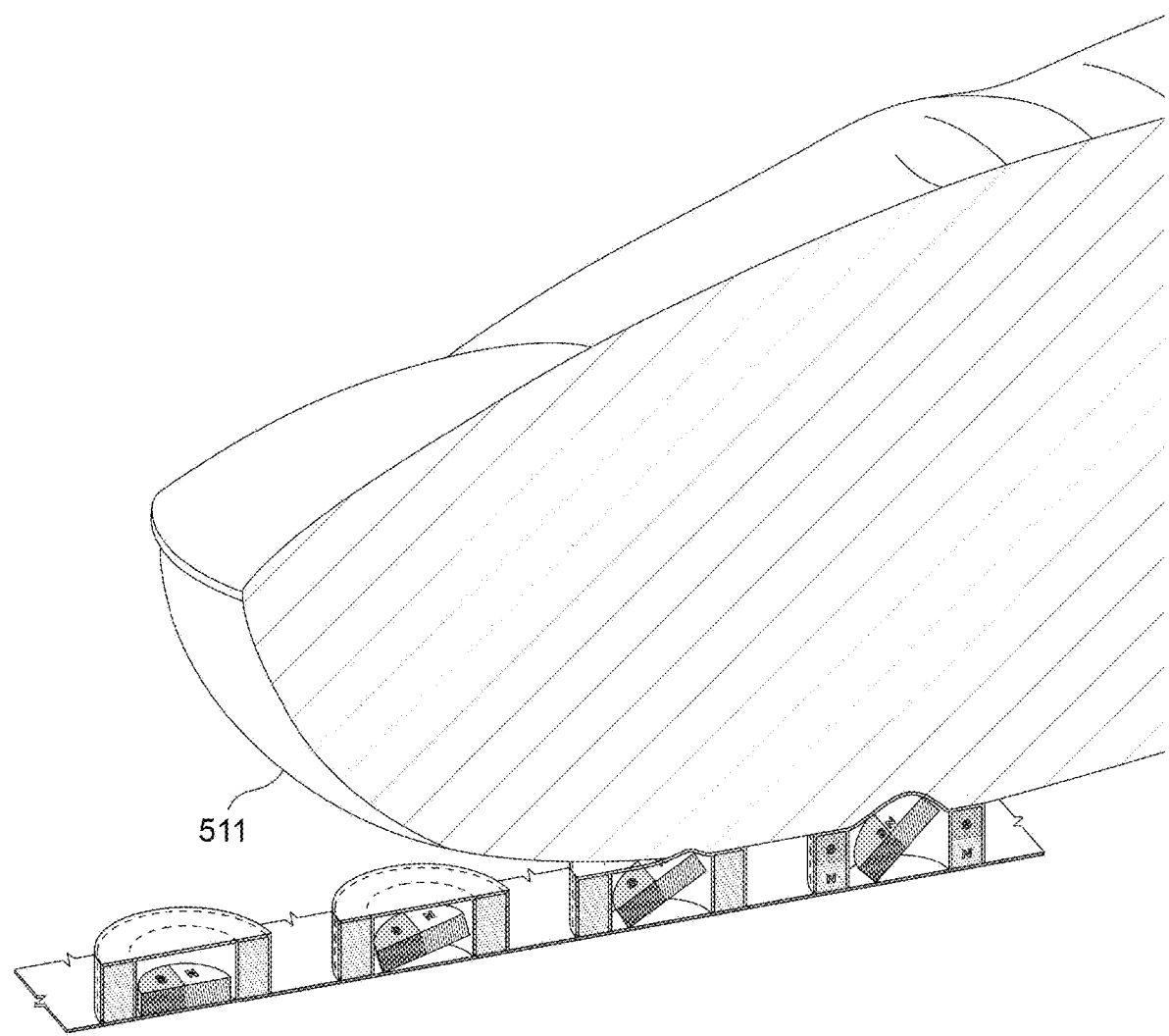
FIG. 5G shows a sectional view of a user's finger together with the haptic communication system depicted in FIG. 5A showing multiple actuators at different stages in the actuation cycle.

FIG. 5G depicts actuators 111 at different stages in their actuation cycle alongside a human finger 511 for scale.

When the actuators 111 demonstrated in FIG. 5A-F are used with the haptic devices 102 of FIGS. 3A-G and FIGS. 4A-E, a feature of this densely packed design is a fast automatic reset (return from the state depicted in FIG. 5C to the state depicted in FIG. 5B) of each activated actuator by its neighbouring actuators once activation current stops. This happens due to the magnetic pull of the magnets in each neighbouring actuator, pulling back the activated one.

Note that other embodiments of such actuators exist and are part of this invention disclosure. The key element is that the actuator has similarly small dimensions and it can tap the skin with a non-vibratory, localized and precise tap, which is optimized to be the smallest and lightest possible tap while still achieving a reliable perception of the tap and the pattern tracing.

The invention claimed is:

1. A haptic communication system comprising:
    a haptic device that is adapted to contact the skin of a user, said haptic device having a plurality of actuators that are electrically connected in an array, wherein each of said plurality of actuators includes an electromagnetic coil and a permanent magnet, said electromagnetic coil having a bottom side that is mounted to a substrate and a top side that defines an open end with a stretchable material disposed over said open end to contain said permanent magnet, said permanent magnet being freely disposed within an interior space defined by an interior surface of said electromagnetic coil, wherein said permanent magnet is adapted to move at least partially above the open end of said electromagnetic coil and deform said stretchable material sufficiently to provide a haptic communication to a user when said actuator with said electromagnetic coil is in a powered state; and
    a controller in communication with said haptic device, wherein said controller is adapted to control the delivery of electrical power from a power source to a desired one or more of said plurality of actuators within said array to provide a haptic communication to a user when said haptic device is in contact with the skin of the user.

2. The haptic communication system of claim 1, wherein said substrate is flexible.

3. The haptic communication system of claim 1, wherein said substrate is rigid.

4. The haptic communication system of claim 1, wherein said plurality of actuators are mounted to a printed circuit board.

5. The haptic communication system of claim 1, wherein said plurality of actuators are arranged in a matrix of rows and columns with each actuator having a unique intersection of a row and a column.

6. The haptic communication system of claim 5, wherein each of said rows and said columns includes a route for connecting to the power source.

7. The haptic communication system of claim 1, wherein each of said plurality of actuators includes a diode.

8. The haptic communication system of claim 1, further comprising a processing device that is adapted to receive an input, translate said input into a haptic message and transmit said haptic message to said controller.

9. The haptic communication system of claim 8, wherein said processing device includes processing software having a haptic translation algorithm for translating said input into the haptic message.

10. The haptic device as claimed in claim 1, wherein said magnet comprises a diametrically magnetized permanent magnet.

11. The haptic device as claimed in claim 1, wherein said magnet comprises an axially magnetized permanent magnet.

12. The haptic device as claimed in claim 1, wherein said magnet comprises a plurality of axially magnetized permanent magnets that are stacked axially.

13. The haptic communication system as claimed in claim 10, wherein said permanent magnet is adapted to pivot within said interior space of said electromagnetic coil, when said actuator with said electromagnetic coil is in a powered state, wherein a portion of said pivoted permanent magnet moves above the open end of said electromagnetic coil.

14. A haptic device for communicating with a user through their sense of touch, said haptic device comprising:
a plurality of actuators that are electrically connected in an array, wherein each of said plurality of actuators includes an electromagnetic coil and a permanent magnet, said electromagnetic coil having a bottom side that is mounted to a substrate and a top side that defines an open end with a stretchable material disposed over said open end to contain said permanent magnet, said permanent magnet being freely disposed within an interior space defined by an interior surface of said electromagnetic coil, wherein said permanent magnet is adapted to move at least partially above the open end of said electromagnetic coil and deform said stretchable material sufficiently to provide a haptic communication to a user when said actuator with said electromagnetic coil is in a powered state.

15. The haptic device as claimed in claim 14, wherein said magnet comprises a diametrically magnetized permanent magnet.

16. The haptic device as claimed in claim 14, wherein said magnet comprises an axially magnetized permanent magnet.

17. The haptic device as claimed in claim 16, wherein said magnet comprises a plurality of axially magnetized permanent magnets that are stacked axially.

18. The haptic device of claim 14, wherein said plurality of actuators are mounted to a printed circuit board.

19. The haptic device of claim 14, wherein said plurality of actuators are arranged in a matrix of rows and columns with each actuator having a unique intersection of a row and a column.

20. The haptic device of claim 19, wherein each of said rows and said columns includes a route for connecting to the power source.

21. The haptic device of claim 1, wherein each of said plurality of actuators includes a diode.

22. The haptic communication system as claimed in claim 15, wherein said permanent magnet is adapted to pivot within said interior space of said electromagnetic coil, when said actuator with said electromagnetic coil is in a powered state, wherein a portion of said pivoted permanent magnet moves above the open end of said electromagnetic coil.

23. A haptic communication method, for communicating with a user through the sense of touch, the method comprising the steps of:
providing a haptic device having a plurality of actuators that are electrically connected in an array, wherein each of said plurality of actuators includes an electromagnetic coil and a permanent magnet, said electromagnetic coil having a bottom side that is mounted to a substrate and a top side that defines an open end with a stretchable material disposed over said open end to contain said permanent magnet, said permanent magnet being freely disposed within an interior space defined by an interior surface of said electromagnetic coil, wherein said permanent magnet is adapted to move at least partially above the open end of said electromagnetic coil sufficiently to provide a haptic communication to a user when said actuator with said electromagnetic coil is in a powered state;
receiving an input signal;
translating the input signal into a haptic message;
transmitting the haptic message to a controller that is configured to control the delivery of electrical power to said plurality of actuators; and
delivering electrical power to one or more of said plurality of actuators in sequence to communicate said haptic message.

24. The haptic communication method as claimed in claim 23, wherein said magnet comprises a diametrically magnetized permanent magnet.

25. The haptic communication method as claimed in claim 23, wherein said magnet comprises an axially magnetized permanent magnet.

26. The haptic communication method as claimed in claim 25, wherein said magnet comprises a plurality of axially magnetized permanent magnets that are stacked axially.

27. The haptic communication method as claimed in claim 24, wherein said permanent magnet is adapted to pivot within said interior space of said electromagnetic coil, when said actuator with said electromagnetic coil is in a powered state, wherein a portion of said pivoted permanent magnet moves above the open end of said electromagnetic coil.

* * * * *